United States Patent
Tanaka et al.

(10) Patent No.: US 10,606,390 B2
(45) Date of Patent: Mar. 31, 2020

(54) TOUCH DETECTION DEVICE AND DISPLAY DEVICE WITH THE SAME

(71) Applicant: Japan Display Inc., Tokyo (JP)

(72) Inventors: Chihiro Tanaka, Tokyo (JP); Naoki Takada, Tokyo (JP); Toshihiko Tanaka, Tokyo (JP); Hayato Kurasawa, Tokyo (JP); Koji Ishizaki, Tokyo (JP); Tatsuya Wakimoto, Tokyo (JP); Masaki Miyatake, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 97 days.

(21) Appl. No.: 15/799,306

(22) Filed: Oct. 31, 2017

(65) Prior Publication Data

US 2018/0136768 A1    May 17, 2018

(30) Foreign Application Priority Data

Nov. 11, 2016   (JP) ................................. 2016-220739

(51) Int. Cl.
| | |
|---|---|
| *G06F 3/041* | (2006.01) |
| *G06F 3/044* | (2006.01) |
| *G02F 1/1333* | (2006.01) |
| *G02F 1/1343* | (2006.01) |
| *G02F 1/1339* | (2006.01) |

(52) U.S. Cl.
CPC ........ *G06F 3/0412* (2013.01); *G02F 1/13338* (2013.01); *G02F 1/133345* (2013.01); *G02F 1/134309* (2013.01); *G06F 3/044* (2013.01); *G06F 3/0416* (2013.01); *G02F 1/1339* (2013.01); *G06F 2203/04111* (2013.01)

(58) Field of Classification Search
CPC combination set(s) only.
See application file for complete search history.

(56) References Cited

U.S. PATENT DOCUMENTS

| | | | |
|---|---|---|---|
| 2016/0054607 A1 | 2/2016 | Ishizaki et al. | |
| 2017/0185192 A1* | 6/2017 | Kim | ..................... G06F 3/0412 |
| 2017/0278469 A1* | 9/2017 | Iwami | ................. H01L 27/1248 |
| 2018/0018051 A1 | 1/2018 | Ogura | |
| 2019/0004624 A1* | 1/2019 | Zhu | ....................... G06F 3/0416 |

FOREIGN PATENT DOCUMENTS

JP    2013-105275 A    5/2013

OTHER PUBLICATIONS

Machine translation of Japanese Office Action dated Feb. 12, 2020 in related Japanese Patent Application No. 2016-220739. 4 pages.

* cited by examiner

*Primary Examiner* — Deeprose Subedi
(74) *Attorney, Agent, or Firm* — K&L Gates LLP

(57) ABSTRACT

According to one embodiment, a touch detection device includes first detection electrodes in a detection area, second detection electrodes in the detection area, extending to intersect the first detection electrodes, first control lines connected to the first detection electrodes, respectively, and provided in a non-detection area, and second control lines connected to the second detection electrodes, respectively, and provided in the non-detection area. The second control lines overlap the first control lines at a plurality of positions as seen in plan view, such that areas of overlapping portions in which the first control lines overlap the second control lines are substantially equalized.

20 Claims, 17 Drawing Sheets

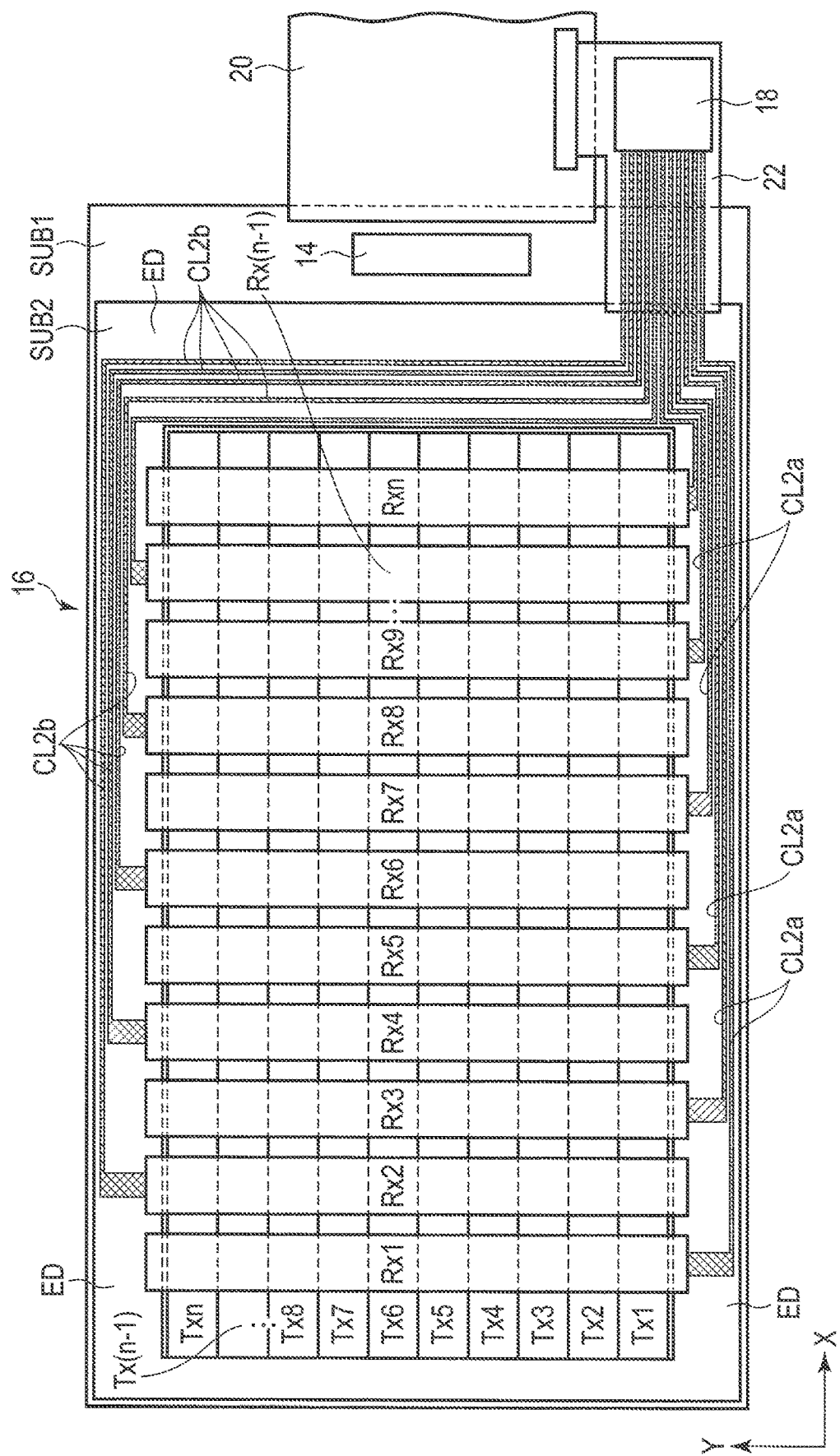
F I G. 2

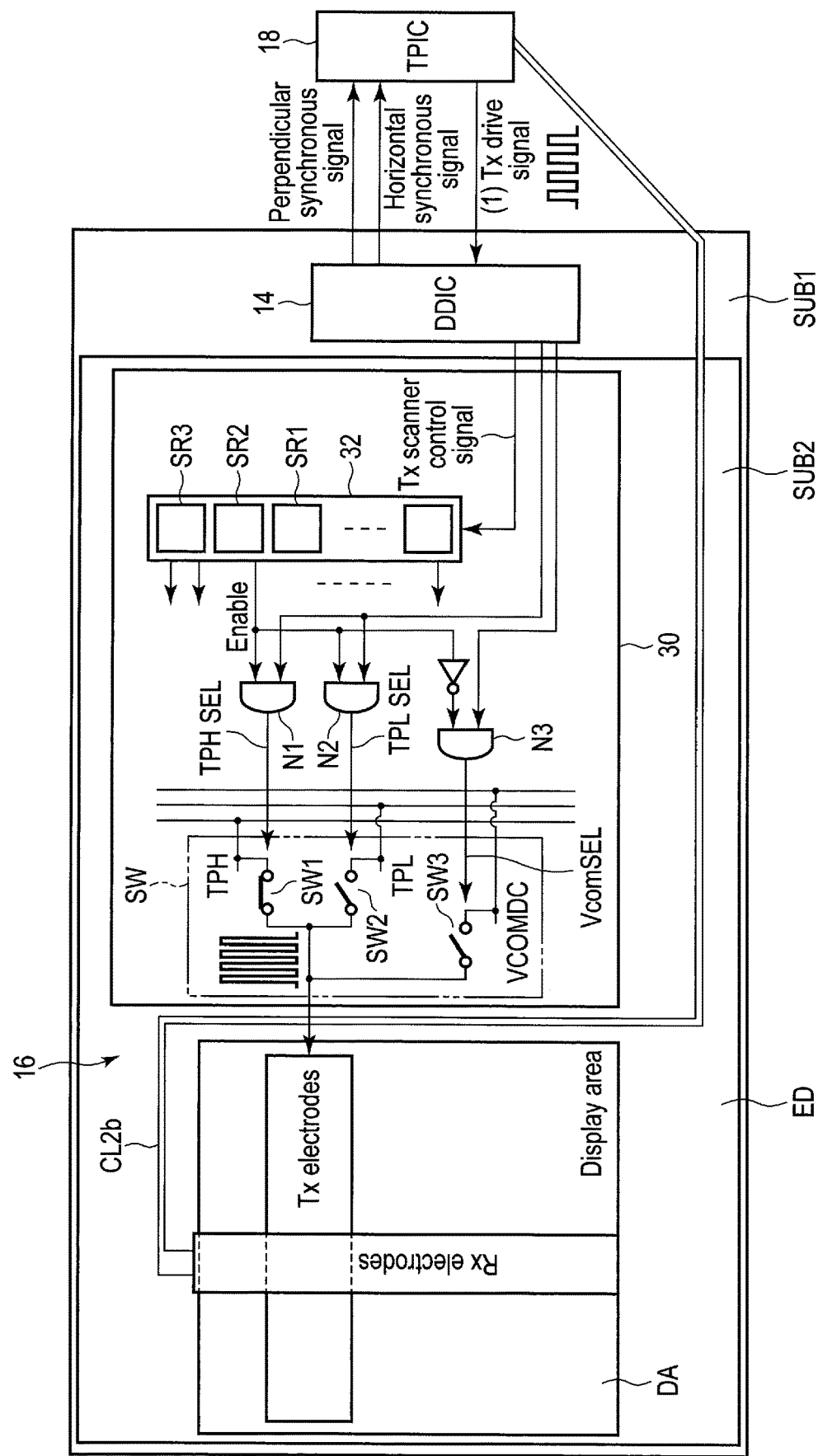
F I G. 3

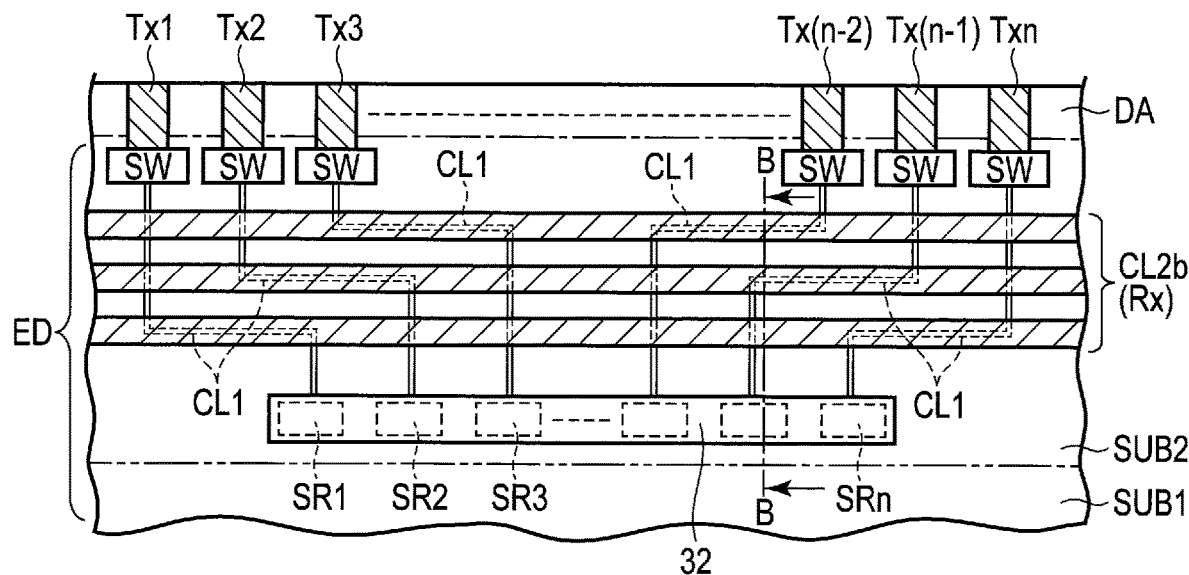
F I G. 5
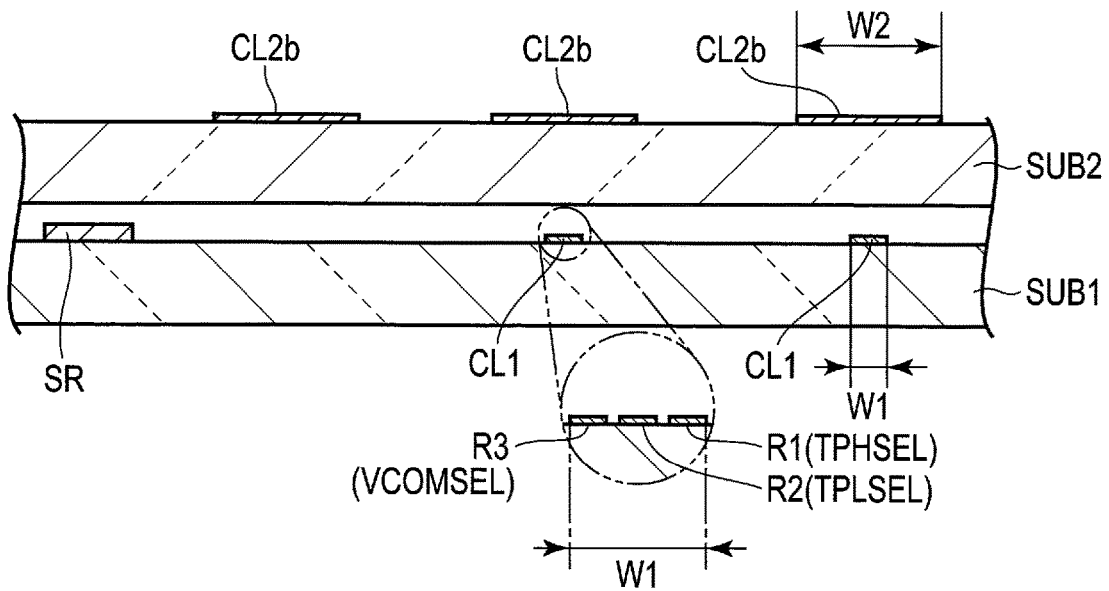
F I G. 6A

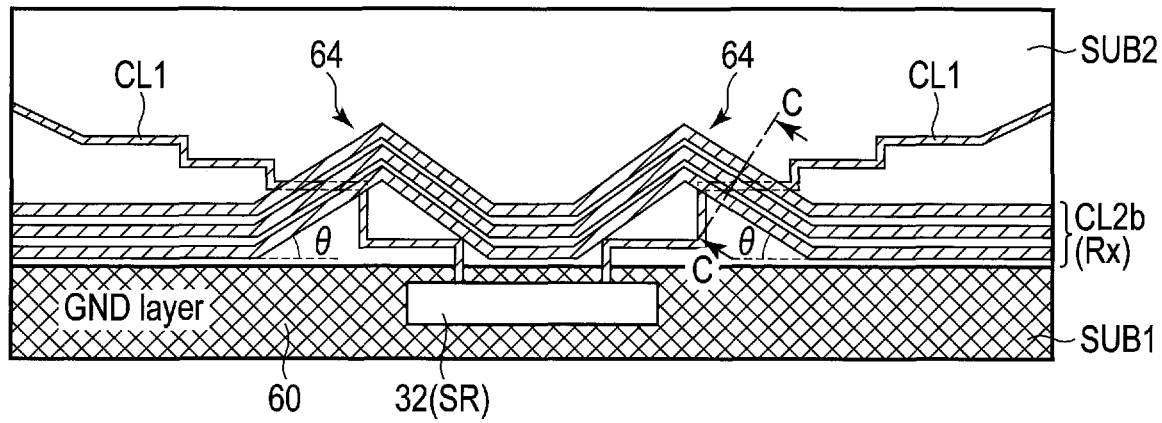
F I G. 8A
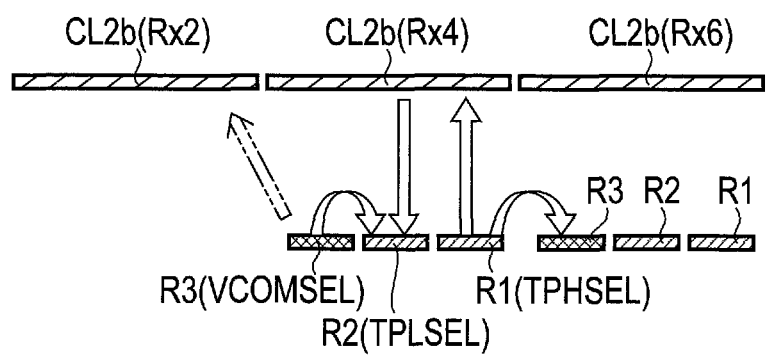
F I G. 8B

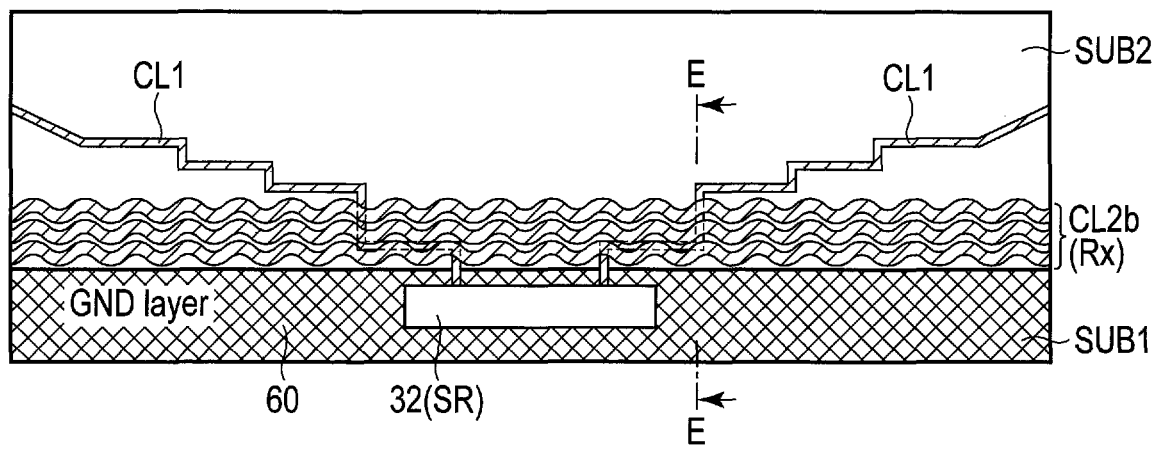
F I G. 10A
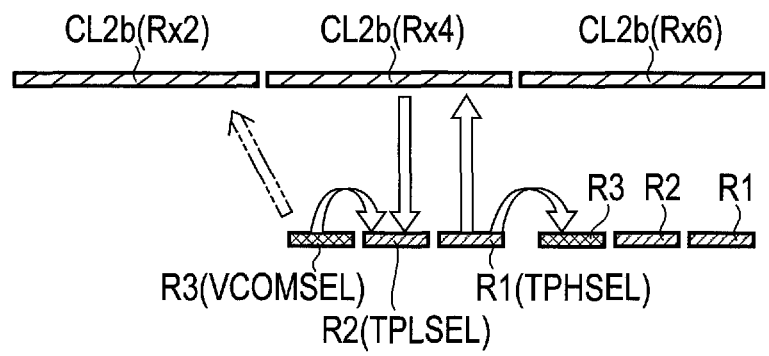
F I G. 10B

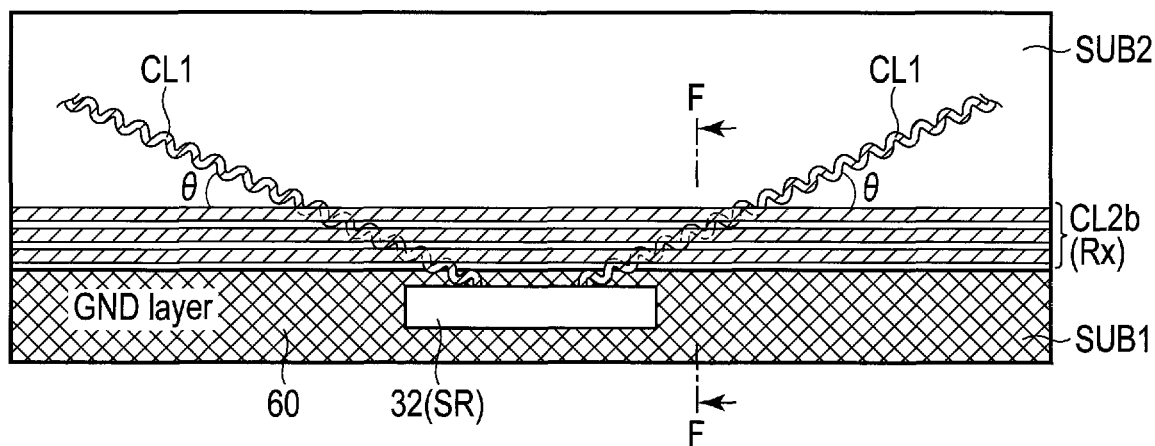
F I G. 11A
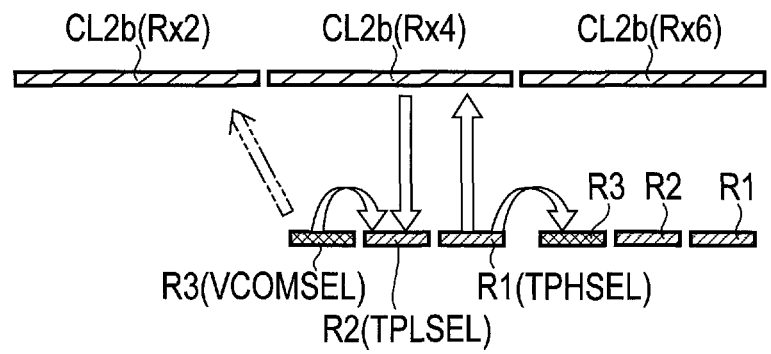
F I G. 11B

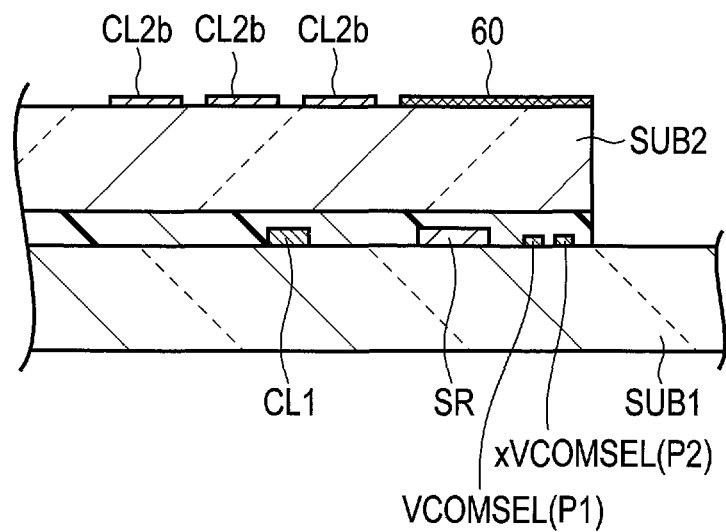
F I G. 14

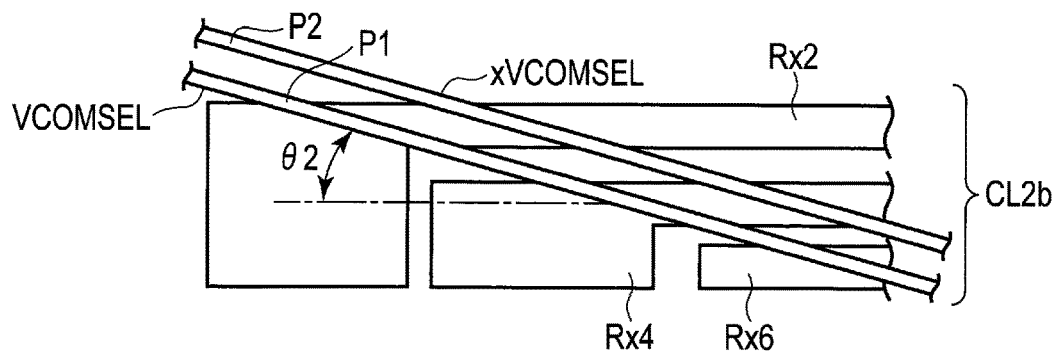
F I G. 16
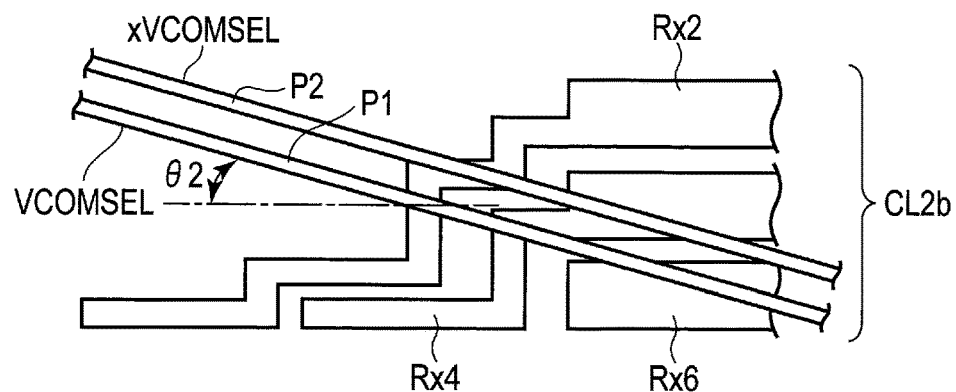
F I G. 17
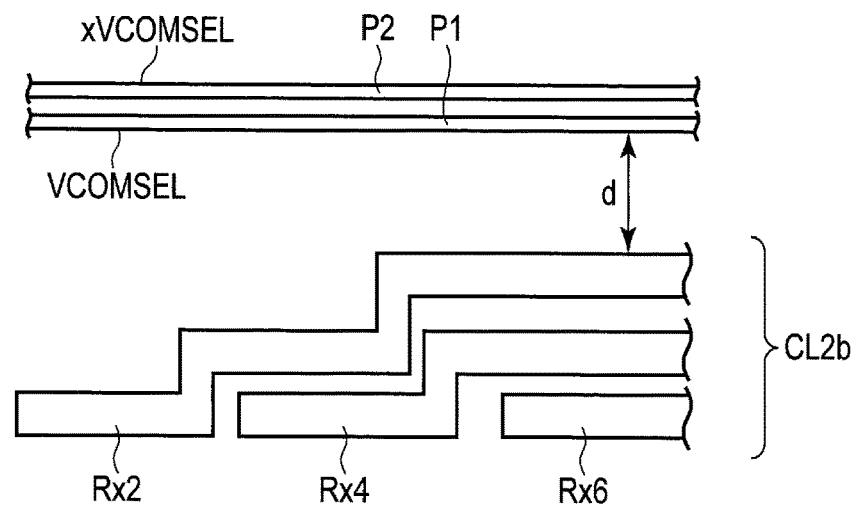
F I G. 18

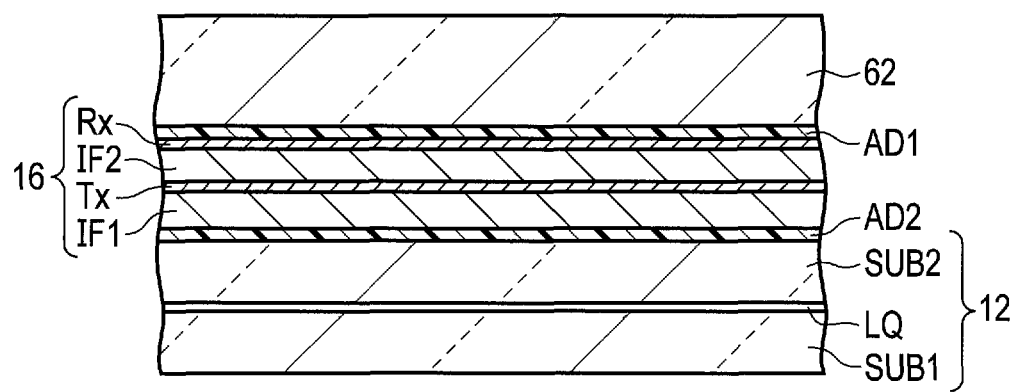
F I G. 19

TOUCH DETECTION DEVICE AND DISPLAY DEVICE WITH THE SAME

CROSS-REFERENCE TO RELATED APPLICATIONS

This application is based upon and claims the benefit of priority from Japanese Patent Application No. 2016-220739, filed Nov. 11, 2016, the entire contents of which are incorporated herein by reference.

FIELD

Embodiments described herein relate generally to a touch detection device and a display device comprising the same.

BACKGROUND

In recent years, as the interface of a display device, a touch sensor (touch detection device) has been used. The touch sensor comprises a plurality of first detection electrodes provided in a detection area. A plurality of first lines connected to the first detection electrodes, respectively, are provided in an outer area (frame area) located outside the detection area.

SUMMARY

The present disclosure generally relates to a touch detection device and a display device comprising the same.

According to one embodiment, a touch detection device includes first detection electrodes in a detection area, second detection electrodes in the detection area, extending to intersect the first detection electrodes, first control lines connected to the first detection electrodes, respectively, and provided in a non-detection area, and second control lines connected to the second detection electrodes, respectively, and provided in the non-detection area. The second control lines overlap the first control lines at a plurality of positions as seen in plan view, such that areas of overlapping portions in which the first control lines overlap the second control lines are substantially equalized.

Additional features and advantages are described herein, and will be apparent from the following Detailed Description and the figures.

BRIEF DESCRIPTION OF THE DRAWINGS

FIG. 2 is a plan view schematically showing a touch detection device (touch sensor) provided in the display device.

FIG. 3 is a block diagram schematically showing an example of a Tx drive circuit provided in the touch sensor.

FIG. 5 is a plan view schematically showing the layout structure of first control lines and second control lines between switches and a Tx scanner in the Tx drive circuit.

FIG. 6A is the cross-sectional view of the display panel taken along the line B-B of FIG. 5.

FIG. 8A is a plan view schematically showing the layout structure of the first and second control lines in the Tx drive circuit of the touch detection device according to a first modification example.

FIG. 8B is the cross-sectional view of the control lines taken along the line C-C of FIG. 8A.

FIG. 10A is a plan view schematically showing the layout structure of the first and second control lines in the Tx drive circuit of the touch detection device according to a third modification example.

FIG. 10B is the cross-sectional view of the control lines taken along the line E-E of FIG. 10A.

FIG. 11A is a plan view schematically showing the layout structure of the first and second control lines in the Tx drive circuit of the touch detection device according to a fourth modification example.

FIG. 11B is the cross-sectional view of the layout structure taken along the line F-F of FIG. 11A according to the fourth modification example.

FIG. 14 is the cross-sectional view of the layout structure taken along the line G-G of FIG. 13 according to the sixth modification example.

FIG. 16 is a plan view schematically showing an example of the line structure according to the second embodiment.

FIG. 17 is a plan view schematically showing a seventh modification example of the line structure according to the second embodiment.

FIG. 18 is a plan view schematically showing an eighth modification example of the line structure according to the second embodiment.

FIG. 19 is a cross-sectional view of a display device and a touch detection device according to a third embodiment.

DETAILED DESCRIPTION

Figure 1:
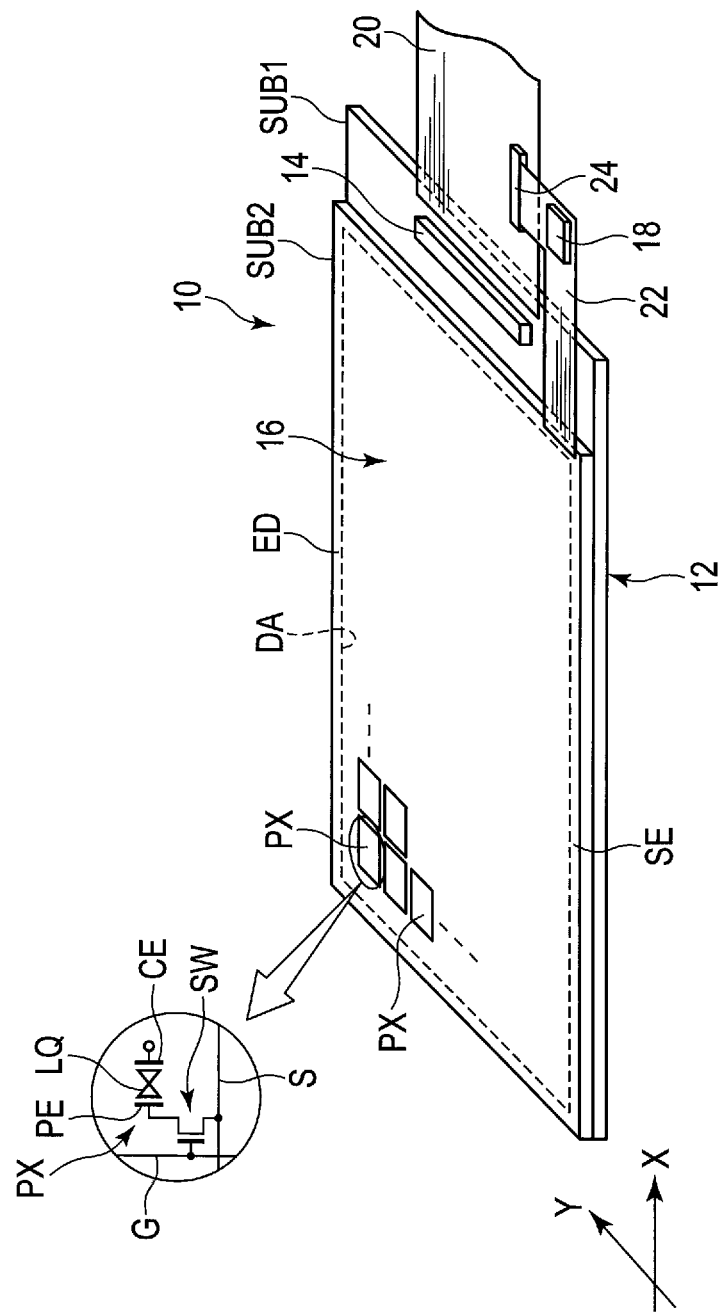
FIG. 1 is a perspective view showing a display device according to a first embodiment.

Various embodiments will be described hereinafter with reference to the accompanying drawings. In general, according to one embodiment, a touch detection device comprises: a plurality of first detection electrodes in a detection area; a plurality of second detection electrodes in the detection area, extending so as to intersect the first detection electrodes; an insulating layer between the first detection electrodes and the second detection electrodes; a plurality of first control lines connected to the first detection electrodes, respectively, and provided in a non-detection area; and a plurality of second control lines connected to the second detection electrodes, respectively, and provided in the non-detection area, and the second control lines overlapping the first control lines at a plurality of positions as seen in plan view, such that areas of overlapping portions in which the first control lines overlap the second control lines are substantially equalized.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is a perspective view schematically showing a display device according to a first embodiment.

As an example of a display device 10, a liquid crystal display device is explained. The display device 10 can be used by incorporating it into various electronic devices such as a smartphone, a tablet terminal, a mobile phone, a notebook computer, a portable game console, a video camera, an electronic dictionary, a vehicle-mounted device or a television receiver. The main structures disclosed in the present embodiment may be applied to a self-luminous display device comprising an organic electroluminescent display element, etc., an electronic paper-type display device comprising a cataphoretic element, a display device to which micro-electromechanical systems (MEMS) are applied, or a display device to which electrochromism is applied.

As shown in FIG. 1, the display device 10 comprises an active-matrix display panel (liquid crystal display panel) 12, a driver IC chip (driver element) 14 which drives the display panel 12, a touch sensor (touch detection device) 16 which detects the proximity or contact of an object such as a finger, a touch control IC (driver element) 18 which drives the touch sensor 16, and a first flexible printed circuit board (FPC) 20 and a second flexible printed circuit board (FPC) 22 connected to the display panel 12. The driver IC chip 14 is mounted on the display panel 12. For example, the touch control IC 18 is mounted on the second FPC 22, and is connected to the first FPC 20 and the driver IC chip 14 via a connector 24.

The display panel 12 comprises a first substrate (array substrate) SUB1 shaped in a rectangular flat plate, a second substrate (counter-substrate) SUB2 facing the first substrate SUB1 and shaped in a rectangular flat plate, and a liquid crystal layer (the liquid crystal layer LQ described later) held between the first substrate SUB1 and the second substrate SUB2. Each of the first and second substrates SUB1 and SUB2 is formed of, for example, an insulating substrate (insulating layer) having a light transmitting property, such as a glass substrate or a resinous substrate. The first substrate SUB1 is attached to the second substrate SUB2 with a sealing material SE in a state where a predetermined cell gap is defined between these substrates. The liquid crystal layer LQ is held in the internal space surrounded by the sealing material SE in the cell gap between the first substrate SUB1 and the second substrate SUB2.

The display panel 12 comprises a display area DA for displaying an image and a non-display area ED surrounding the display area DA and shaped like a frame inside the sealing material SE as seen in plan view (hereinafter indicating a state in which the display panel 12 is seen in a direction perpendicular to the display panel). In the present embodiment, the display area DA also functions as a touch detection area for detecting the proximity and touch of a finger, etc. The non-display area ED also functions as a non-detection area.

The display panel 12 comprises a plurality of pixels PX arranged in matrix in the display area DA. The first substrate SUB1 comprises, in the display area DA, source lines S extending in a first direction X, gate lines G extending in a second direction Y perpendicular to the first direction X, a switching element SW electrically connected to a gate line G and a source line S in each pixel PX, a pixel electrode PE connected to a switching element SW in each pixel PX, etc. A common electrode CE having common potential is provided in the first substrate SUB1 or the second substrate SUB2, and faces a plurality of pixel electrodes PE. The gate lines G may not be formed in a linear fashion parallel to the second direction Y. The source lines S may not be formed in a linear fashion parallel to the first direction X. The gate lines G and the source lines S may be curved, or may partially branch off.

The display panel 12 is, for example, a transmissive-type display panel comprising a transmissive display function for displaying an image by selectively transmitting light from a backlight device. The display panel 12 may be a reflective-type display panel comprising, in addition to a transmissive display function, a reflective display function for displaying an image by selectively reflecting light from the display side, such as external light or auxiliary light. Further, the display panel 12 may be a transflective-type display panel comprising a transmissive display function and a reflective display function.

As a display mode, the display panel 12 may comprise a structure corresponding to a lateral electric field mode mainly using a lateral electric field substantially parallel to the main surfaces of the substrates or a structure corresponding to a longitudinal electric field mode mainly using a longitudinal electric field substantially perpendicular to the main surfaces of the substrates.

FIG. 2 is a plan view of the display panel and schematically shows an example of the electrode structure of the touch sensor 16. As shown in FIG. 2, the touch sensor 16 comprises a plurality of, for example, 33 first detection electrodes Tx1 to Txn provided on the first substrate SUB1, and a plurality of, for example, 63 second detection electrodes Rx1 to Rxn provided on the upper surface of the second substrate SUB2 which is an insulating layer (in other words, provided on a surface opposite to the first substrate SUB1). In FIG. 2, to simplify the illustration, the number of electrodes is decreased from the actual number of electrodes. The first detection electrodes Tx1 to Txn are formed in a stripe fashion and extend in the longitudinal direction (first direction X) of the first substrate SUB1. The first detection electrodes Tx1 to Txn are arranged in parallel to each other at regular intervals in a width direction (second direction Y) perpendicular to the longitudinal direction. The first detection electrodes Tx1 to Txn face substantially the entire display area (touch detection area) DA. In the present embodiment, the first detection electrodes Tx1 to Txn also function as the common electrode CE of the display panel 12. The first detection electrodes Tx1 to Txn (common electrode CE) are formed of a transparent conductive material such as indium tin oxide (ITO) or indium zinc oxide (IZO).

The second detection electrodes Rx1 to Rxn are formed in a stripe fashion and extend in the width direction (second direction Y) of the second substrate SUB2, in other words, in a direction perpendicular to or intersecting the extension direction of the first electrodes Tx1 to Txn. The second detection electrodes Rx1 to Rxn are arranged in parallel to each other at regular intervals in the longitudinal direction of the second substrate SUB2. The second detection electrodes Rx1 to Rxn face substantially the entire display area DA. In this manner, in the display area DA, the second detection electrodes Rx1 to Rxn are provided so as to intersect the first detection electrodes Tx1 to Txn and further to overlap the first detection electrodes Tx1 to Txn across the intervening second substrate SUB2.

The second detection electrodes Rx are formed of a conductive transparent material. The conductive transparent material is, for example, an oxide material such as ITO or IZO. The oxide material preferably contains at least one of indium, tin, zinc, gallium and titanium. The conductive transparent material is not particularly limited to an oxide material, and may be, for example, a conductive organic material or a dispersing element containing fine conductive substances. The second detection electrodes Rx may not be formed of the above transparent materials, and may be formed by a conductive film including a metal layer or alloy layer formed of at least one metal selected from a group consisting of aluminum (Al), copper (Cu), silver (Ag), molybdenum (Mo), chromium (Cr) and tungsten (W). The conductive film is nonvisualized by a blackening treatment or a mesh process.

The first detection electrodes Tx may extend in the second direction Y instead of the first direction X. In this case, the second detection electrodes Rx extend in the first direction X.

The touch sensor 16 comprises a plurality of first control lines CL1 connected to the first detection electrodes tx1 to Txn, respectively, and a plurality of second control lines CL2 connected to the second detection electrodes Rx1 to Rxn, respectively. The first control lines CL1 are control lines for electrically connecting the first detection electrodes Tx and shift registers SR or the driver IC chip 14. In the present embodiment, the first control lines CL1 extend from ends of the first detection electrodes TX1 to Txn in the longitudinal direction, for example, the ends on the driver IC chip 14 side, to the driver IC chip 14 via the non-display area ED of the display panel 12. The first control lines CL1 are explained in detail later.

The second control lines CL2 (a and b) are control lines for electrically connecting the second detection electrodes Rx and the touch control IC 18. The second control lines CL2 extend from ends of the second detection electrodes Rx1 to Rxn in the longitudinal direction and are connected to the second FPC 22 via the non-display area ED of the display panel 12. In the present embodiment, with respect to the second detection electrodes Rx1, Rx3, . . . , Rxn provided in the odd-numbered columns, in FIG. 2, the second control lines CL2a extend from the first ends (the lower ends in FIG. 2) of the second detection electrodes Rx to the second FPC 22 via the non-display area ED on the first edge side (the lower edge side in FIG. 2). With respect to the second detection electrodes Rx2, Rx4, . . . , Rxn−1 provided in the even-numbered columns, in FIG. 2, the second control lines CL2b extend from the second ends (the upper ends in FIG. 2) of the second detection electrodes Rx to the second FPC 22 via the non-display area ED on the second edge side (the upper edge side in FIG. 2) and the non-display area ED on the short-side side.

In the present embodiment, the second FPC 22 is attached to the third side (the short side on which the FPC is attached in FIG. 2) of the second substrate SUB2 such that the attached portion is close to an end of the short side, in other words, the second FPC 22 is attached to the vicinity of the first end of the third side of the second substrate SUB2 in FIG. 2. Thus, the second control lines CL2b connected to the second detection electrodes Rx2, Rx4, . . . , Rxn−a provided in the even-numbered columns extend substantially over the entire width in the third end portion of the second substrate SUB2 on the third short side.

Figure 4:
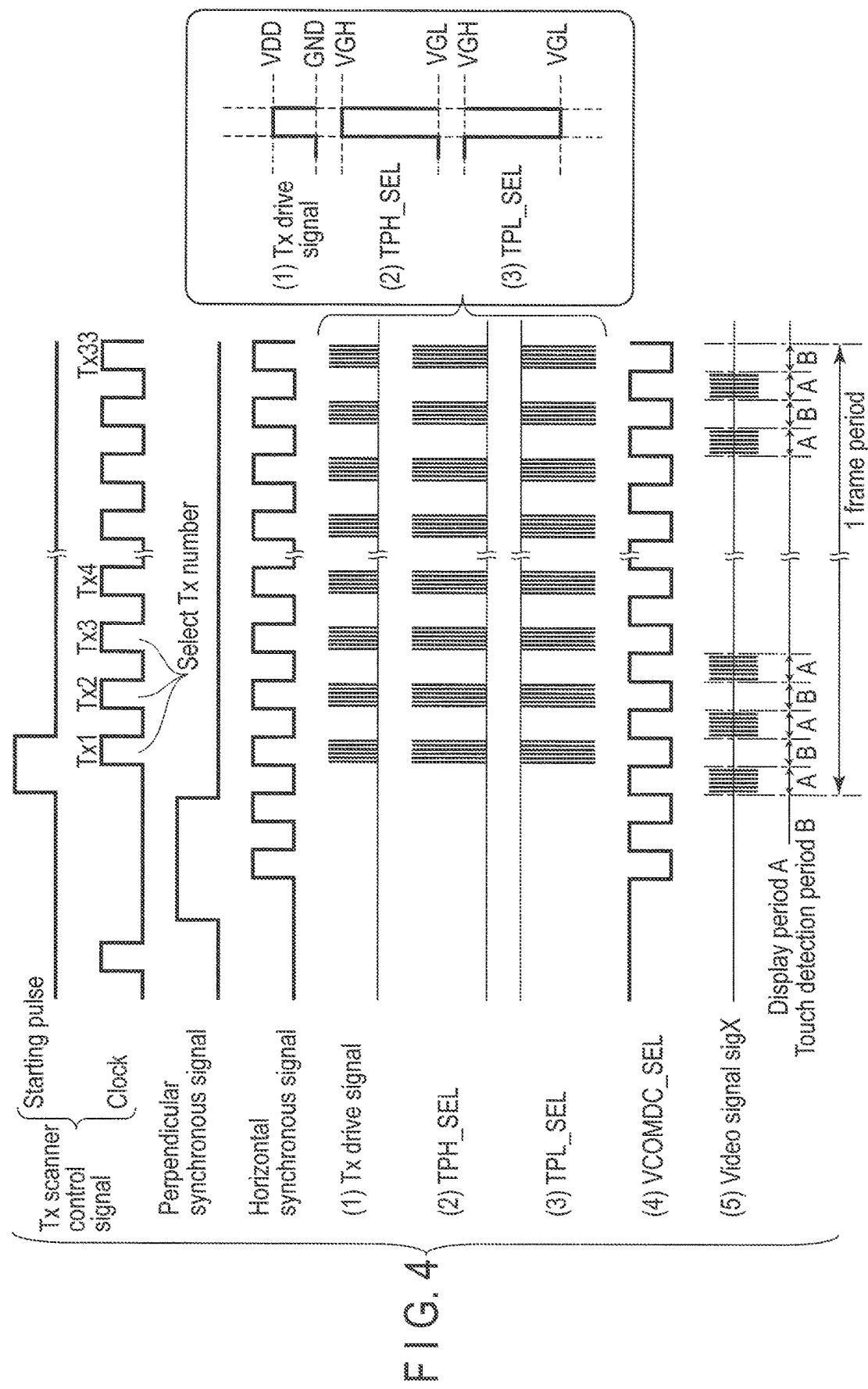
FIG. 4 is a timing chart showing the timing for driving the touch sensor.

FIG. 3 is a block diagram schematically showing an example of the drive circuit of the touch sensor 16. FIG. 4 is a timing chart showing the timing for driving the touch sensor.

As shown in FIG. 3, the touch sensor 16 comprises a Tx drive circuit 30 provided on the first substrate SUB1 and sequentially driving the first detection electrodes Tx1 to Txn. The Tx drive circuit 30 comprises a Tx scanner 32 including a plurality of shift registers SR1, SR2, SR3, . . . , a plurality of AND gates N1, N2 and N3 outputting a select signal, and switches SW each including switching elements SW1, SW2 and SW3.

The switching element SW1 is provided between the first detection electrode Tx and a TPH line and applies a high-level detection drive signal TPH to the first detection electrode Tx by opening and closing in accordance with a select signal TPHSEL from the AND gate N1. The switching element SW2 is provided between the first detection electrode Tx and a TPL line and applies a low-level detection drive signal TPL to the first detection electrode Tx by opening and closing in accordance with a select signal TPLSEL from the AND gate N2. The switching element SW3 is provided between the first detection electrode Tx and a Vcom power control line and applies Vcom voltage to the first detection electrode Tx by opening and closing in accordance with a select signal VcomSEL from the AND gate N3.

The Tx scanner 32 sequentially drives the shift registers SR1, SR2, SR3, . . . , in accordance with a scanner control signal from the driver IC chip 14. The output signals of the shift registers SR1, SR2, SR3, . . . , are input to one of the input terminals of each of the AND gates N1, N2 and N3. A signal VcomSEL is input from the driver IC chip 14 to the other input terminal of each of the AND gates N1, N2 and N3.

The driver IC chip 14 inputs a perpendicular synchronous signal and a horizontal synchronous signal to the touch control IC 18 for touch detection. The touch control IC 18 inputs the drive signals of the first detection electrodes Tx to the driver IC chip 14 in accordance with the input synchronous signals. The detection signals detected in the second detection electrodes Rx are transmitted to the touch control IC 18 for touch detection through the second lines CL2.

As shown in FIG. 4, the driver IC chip 14 alternately repeats a display period A and a touch detection period B a plurality of times in each horizontal period in accordance with horizontal synchronous signals. In each display period A, the Tx drive circuit 30 switches the switching element SW3 on, switches the switching elements SW2 and SW3 off, and applies Vcom voltage to the first detection electrodes (common electrode) Tx. In each display period A, the driver IC chip 14 supplies a switching signal and a video signal SigX to the gate lines and the video signal lines of the display area DA through the control lines described later.

In the touch detection periods B, the driver IC chip 14 selects one of the shift registers SR1, SR2, . . . , in order, and alternately switches the switching elements SW1 and SW2 on and off in accordance with a Tx drive signal from the touch control IC 18. In this way, in the touch detection periods B, a high-level (in-phase) detection drive signal TPH and a low-level (opposite-phase) detection drive signal TPL are alternately applied to the first detection electrodes Tx. When a finger approaches or touches the display surface (detection area) of the display panel 12 in a touch detection period B, capacitance is applied to the second detection electrodes Rx based on the touch position, and the capacitance between the first detection electrodes Tx and the second detection electrodes Rx is changed. A detection signal including this change in the capacitance is transmitted from the second detection electrodes Rx to the touch control IC 18. The touch control IC 18 detects a touch and the position of the touch coordinates based on the received detection signal.

FIG. 5 is a plan view schematically showing the layout structure of the first control lines CL1 and the second control lines CL2 between the switches SW and the Tx scanner 32 (shift registers SR) in the Tx drive circuit 30.

In the present embodiment, as shown in FIG. 5, the switches SW of the Tx drive circuit 30 are adjacent to ends of the respective first detection electrodes Tx1 to Txn in the longitudinal direction (for example, the ends on the driver IC chip 14 side), and are directly connected to these ends of the first detection electrodes Tx1 to Txn. The second control lines CL2*b* connected to the second detection electrodes Rx2 to Rxn−1 provided in the even-numbered columns are provided between the switches SW and the Tx scanner 32 (shift registers SR) and extend substantially in parallel to the short sides of the second substrate SUB2 in the non-display area ED of the second substrate SUB2 on the short-side side.

The first control lines CL1 for transmitting a control signal to the respective switches SW extend from the shift registers SR1 to SRn to the respective switches SW. In the present embodiment, for example, each first control line CL1 is provided so as to be bent in a staircase pattern. Specifically, each first control line CL1 extends from a corresponding shift register SR in a direction perpendicular to the second control lines CL2*b*, is bent at right angle, extends in parallel to the second control lines CL2*b*, is bent at right angle, and extends to a corresponding switch SW in a direction perpendicular to the second control lines CL2. In this manner, each first control line CL1 is provided so as to partially and perpendicularly overlap some second control lines CL2, and extends so as to partially overlap a second control line CL2*b* in parallel. Thus, as seen in plan view, a large part of each first control line CL1 extends at an inclination angle other than an angle parallel to the second control lines CL2*b*. In the present embodiment, a large part of each first control line CL1 extends substantially at right angle to the second control lines CL2*b*, and only a part of each first control line CL1 extends substantially in parallel to the second control lines CL2*b*. As seen in plan view, each first control line CL1 partially overlaps the second control lines CL2*b*, and does not overlap the second control lines CL2*b* in parallel over the entire length. Further, as described later, the width W1 of each first control line CL1 is far less than the width W2 of each second control line CL2*b*. Thus, the overlapping area can be reduced even in the overlapping portions between the first control lines CL1 and the second control lines CL2.

To simplify the illustration, the other first detection electrodes Tx, switches SW and first control lines CL1 located in the central part are omitted in FIG. 5.

FIG. 6A is the cross-sectional view of the display panel taken along the line B-B of FIG. 5. As shown in FIG. 5 and FIG. 6A, the width W1 of each first control line CL1 is less than the width of each first detection electrode Tx and the width W2 of each second control line CL2. In the present embodiment, the width W1 of each first control line CL1 is less than or equal to half the width W2 of each second control line CL2, and is preferably less than or equal to one-fifth the width W2 of each second control line CL2. Since the first control lines CL1 only transmit a select signal from the shift registers SR to the switches SW, the first control lines CL1 may be formed by thin lines. In the first control lines CL1, the potential of the lines from the shift registers SR1 to SRn to the switches SW is, for example, 2.5 to 8 V. The potential of the lines from the switches SW to the first detection electrodes Tx is, for example, approximately 8 or 10 V.

Each first control line CL1 is a set of three conductive lines, specifically, a conductive line R1 (TPHSEL) for transmitting a select signal to the switch SW1 (TPH), a conductive line R2 (TPLSEL) for transmitting a select signal to the switch SW2 (TPL), and a conductive line R3 (VcomSEL) for transmitting a select signal to the switch SW3 (VCOMDC). The total width of the three conductive lines R1 to R3 is equivalent to the width W1 of each first control line CL1. All the three conductive lines R1 to R3 included in each first control line CL1 overlap a common second control line CL2*b* at each overlapping position.

Figure 6B:
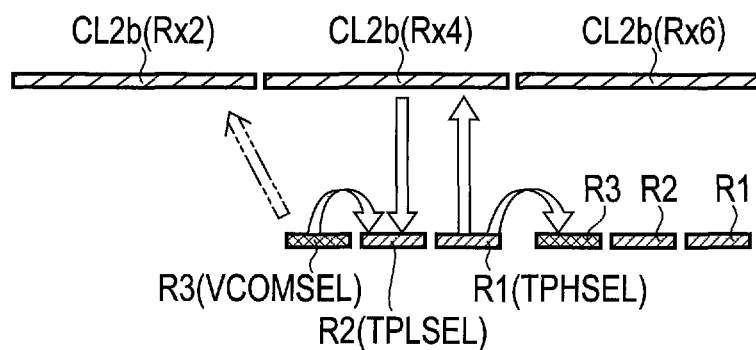
FIG. 6B is the cross-sectional view of the control lines taken along the line B-B of FIG. 5.

FIG. 6B is a cross-sectional view schematically showing the cross-sectional surfaces of the control lines along the line B-B of FIG. 5. In the above line structure, some second control lines CL2 overlap some first control lines CL1, and the other second control lines CL2 do not overlap any first control line CL1 in some intersecting portions. For example, in the cross-sectional surface shown in FIG. 6B, two second control lines CL2 (Rx4 and Rx6) overlap the first control lines CL1, and a second control line CL2 (Rx2) does not overlap any first control line CL1. In this case, coupling occurs between the two second control lines CL2 (Rx4 and Rx6) and the two first control lines CL1 in an overlap state. Further, as indicated with the alternate long and two short dashes arrow in FIG. 6B, coupling may occur between the second control line CL2 (Rx2) and the first control line CL1 in a non-overlap state. To prevent the coupling between the second control line CL2 (Rx2) and the first control line CL1 in a non-overlap state, in the present embodiment, the three conductive lines included in each first control line CL1 are arranged such that the conductive line R3 (VCOMSEL) with fixed potential is the closest to the non-overlapping second control line CL2 (Rx2). The conductive line R3 is provided in the boundary portion between the area which overlaps the second control line CL2*b* and the area which does not overlap the second control line CL2*b*. The three conductive lines R1, R2 and R3 included in each first control line CL1 are arranged in the order of R3, R2 and R1 from the non-overlapping second control line CL2 (Rx2) side.

When each first control line CL1 has the above arrangement, unnecessary coupling is prevented, and thus, it is possible to further effectively prevent noise in the touch detection area and the degradation of the touch detection performance. The order of the conductive lines R2 and R1 may be reversed.

Figure 7:
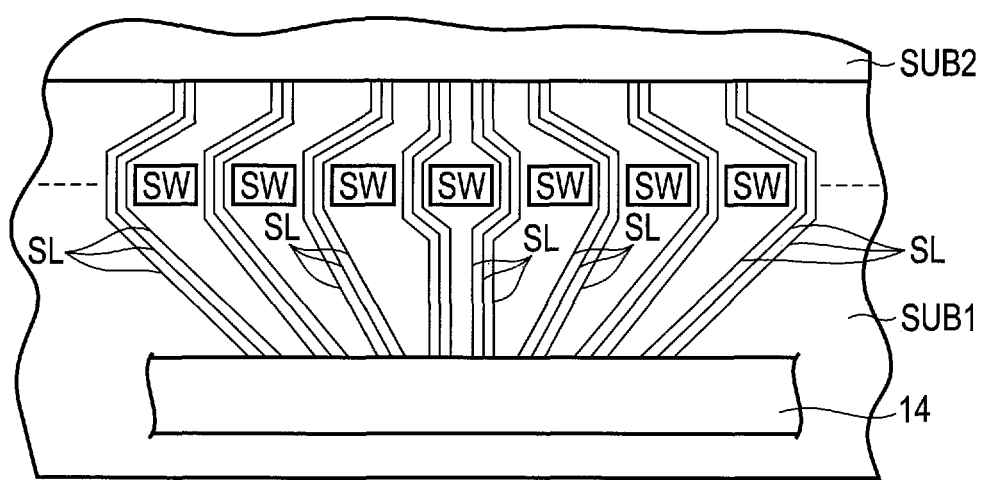
FIG. 7 is a plan view schematically showing the layout structure of signal lines provided in a non-display area provided in a first substrate.

FIG. 7 is a plan view schematically showing the layout structure of the signal lines SL provided in the non-display area ED of the first substrate SUB1. As shown in FIG. 7, in the present embodiment, the signal lines SL1 extending from the driver IC chip 14 to the source lines S or the video signal lines of the display area DA are arranged so as to avoid the switches SW1 to SWn in the first substrate SUB1. For example, a plurality of signal lines SL1 are put together as a group, and each group of signal lines SL1 is provided between corresponding two adjacent switches SW.

According to the touch detection device and the liquid crystal display device having the above structure in the present embodiment, a large part of each of the first control lines CL1 connected to the first detection electrodes Tx1 to Txn for touch detection overlaps the second control lines CL2b at an angle different from a parallel angle. Thus, the area of the portions in which the first control lines CL1 overlap the second control lines CL2 in parallel is reduced. At the same time, the width W1 of each first control line CL1 is less than the width W2 of each second control line CL2b (the width W1 is less than or equal to half the width W2, and is preferably less than or equal to one-fifth the width W2). Thus, the area (overlapping area) of the portions in which the first control lines CL1 overlap the second control lines CL2b can be reduced. In this way, the coupling capacity formed in the overlapping portions between the first control lines CL1 and the second control lines CL2b can be reduced. It is possible to obtain a touch detection device capable of realizing stable touch detection over the entire touch detection area and a display device comprising the touch detection device by preventing noise in the touch detection area and the degradation of the touch detection performance due to coupling capacity. The number of first and second detection electrodes or their shape or material is not limited to the above first embodiment, and may be arbitrarily changed. The first detection electrodes of the touch detection device may not be provided on the first substrate SUB1 of the display panel 12. The first detection electrodes may be stacked on the display surface of the second substrate SUB2 such that the first detection electrodes, an insulating layer and the second detection electrodes are stacked.

Now, this specification explains display devices and touch detection devices according to various modification examples and other embodiments. In the modification examples and embodiments explained below, the same elements as those of the first embodiment are denoted by the same reference numbers, and detailed description thereof is simplified or omitted. Elements different from those of the first embodiment are mainly explained in detail.

First Modification Example

FIG. 8A is a plan view schematically showing the layout structure of the first and second control lines of the display device and the touch detection device according to a first modification example. In the first modification example, at least one group of the first control lines CL1 and the second control lines CL2b extends so as to intersect or overlap the other group of the first control lines CL1 and the second control lines CL2b at an inclination angle, in other words, at a slant, at overlapping positions. As shown in FIG. 8, in the first modification example, the second control lines CL2b connected to the second detection electrodes Rx2, ..., Rxn−1 provided in the even-numbered columns extend in a direction parallel to the short sides of the second substrate SUB2 between the switches SW and the Tx scanner 32 (shift registers SR) in the non-display area ED on the short-side side of the second substrate SUB2. Further, a part of each of the second control lines CL2, for example, the portion near the Tx scanner 32 comprises a plurality of inclined portions 64 inclined in a saw-blade fashion. The inclined portions 64 are inclined at an angle θ, for example, 30 to 90 degrees, to a direction parallel to the short sides of the second substrate SUB2.

The first control lines CL1 for transmitting a control signal to the respective switches SW extend from the shift registers SR1 to SRn to the respective switches SW. In the present modification example, each first control line CL1 is bent in a stepwise manner. Each first control line CL1 extends from a corresponding shift register SR in a direction perpendicular to the short sides of the second substrate SUB2, is bent at right angle, extends in parallel to the short sides of the second substrate SUB2, is bent at right angle, and extends to a corresponding switch SW. Each first control line CL1 extends so as to partially intersect the inclined portions 64 of the second control lines CL2b. Since each inclined portion 64 is inclined at an angle θ, each first control line CL1 also extends so as to intersect or overlap the second control lines CL2 at an inclination angle of θ to 90 degrees. In this way, the first control lines CL1 do not overlap the second control lines CL2b in parallel. The area of the overlapping portions can be reduced. At the same time, the overlapping areas of the portions in which the first control lines CL1 overlap a plurality of second control lines CL2 are equalized. Thus, it is possible to prevent noise in the touch detection area and the degradation of the touch detection performance.

Further, a ground layer 60 may be formed in the peripheral portion of the second substrate SUB2 outside the second control lines CL2. The ground layer 60 overlaps the shift registers SR.

FIG. 8B is a cross-sectional view schematically showing the cross-sectional surface of the control lines along the line C-C of FIG. 8A. In the above line structure, some second control lines CL2 overlap some first control lines CL1, and the other second control lines CL2 do not overlap any first control line CL1 at some intersecting portions. For example, in the cross-sectional surface shown in FIG. 8B, two second control lines CL2 (Rx4 and Rx6) overlap the first control lines CL1, and a second control line CL2 (Rx2) does not overlap any first control line CL1. In this case, coupling occurs between the two second control lines CL2 (Rx4 and Rx6) and the two first control lines CL1 in an overlap state. Further, as indicated with the alternate long and two short dashes arrow in FIG. 8B, coupling may occur between the second control line CL2 (Rx2) and the adjacent first control line CL1 in a non-overlap state. To prevent the coupling between the second control line CL2 (Rx2) and the first control line CL1 in a non-overlap state, in the present modification example, the three conductive lines included in each first control line CL1 are arranged such that the conductive line R3 (VCOMSEL) with fixed potential is the closest to the non-overlapping second control line CL2 (Rx2). The conductive line R3 is provided in the boundary portion between the area which overlaps the second control line CL2b and the area which does not overlap the second control line CL2b. The three conductive lines R1, R2 and R3 included in each first control line CL1 are arranged in the order of R3, R2 and R1 from the non-overlapping second control line CL2 (Rx2) side.

When each first control line CL1 has the above arrangement, unnecessary coupling is prevented, and thus, it is possible to further effectively prevent noise in the touch detection area and the degradation of the touch detection performance. The order of the conductive lines R2 and R1 may be reversed.

Second Modification Example

Figure 9A:
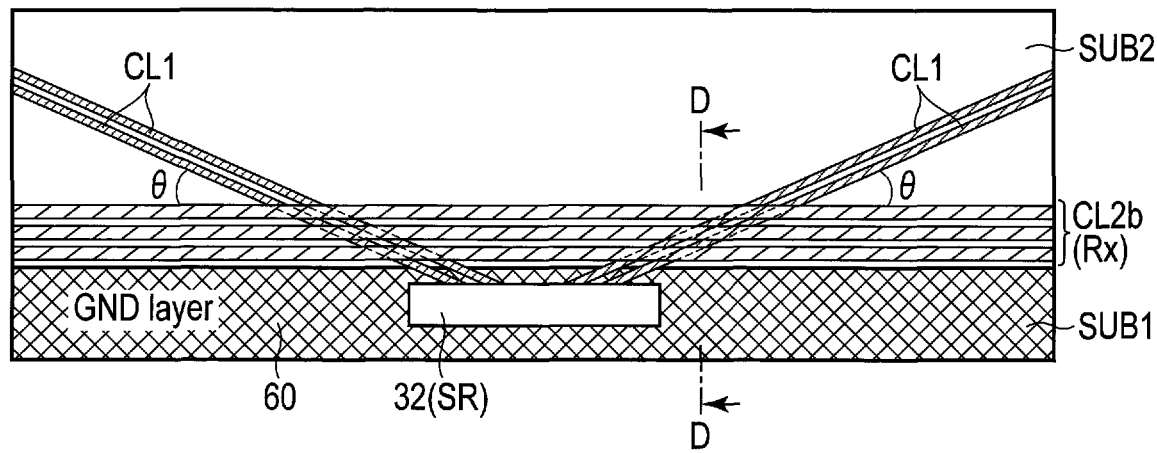
FIG. 9A is a plan view schematically showing the layout structure of the first and second control lines in the Tx drive circuit of the touch detection device according to a second modification example.

FIG. 9A is a plan view schematically showing the layout structure of the first and second control lines of the display device and the touch detection device according to a second modification example. In the second modification example, at least one group of the first control lines CL1 and the second control lines CL2b extends so as to intersect and overlap the other group of the first control lines CL1 and the second control lines CL2b at an inclination angle, in other words, at a slant, at overlapping positions. As shown in FIG. 9, in the second modification example, the second control lines CL2b connected to the second detection electrodes Rx2, . . . , Rxn−1 provided in the even-numbered columns extend in a direction parallel to the short sides of the second substrate SUB2 between the switches SW and the Tx scanner 32 (shift registers SR) in the non-display area ED on the short-side side of the second substrate SUB2.

The first control lines CL1 for transmitting a control signal to the respective switches SW linearly extend from the shift registers SR1 to SRn to the respective switches SW. Each first control line CL1 is inclined at an angle θ, for example, 30 to 90 degrees, to a direction parallel to the short sides of the second substrate SUB2, in other words, to the second control lines CL2b. Each first control line CL1 extends so as to partially cross the second control lines CL2b. Each first control line CL1 extends so as to intersect or overlap the second control lines CL2 at an inclination angle θ. In this way, the first control lines CL1 do not overlap the second control lines CL2b in parallel. The area of the overlapping portions can be reduced. At the same time, the overlapping areas of the portions in which the first control lines CL1 overlap a plurality of second control lines CL2 are substantially equalized. Thus, it is possible to prevent noise in the touch detection area and the degradation of the touch detection performance.

Figure 9B:
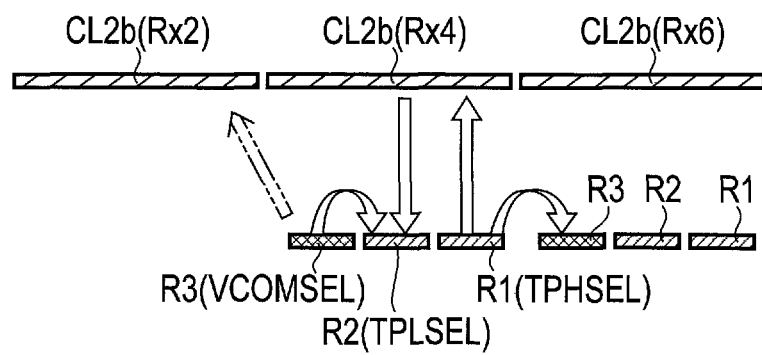
FIG. 9B is the cross-sectional view of the control lines taken along the line D-D of FIG. 9A.

FIG. 9B is a cross-sectional view schematically showing the cross-sectional surface of the control lines along the line D-D of FIG. 9A. In the above line structure, some second control lines CL2 overlap some first control lines CL1, and the other second control lines CL2 do not overlap any first control line CL1 at some intersecting positions. For example, in the cross-sectional surface shown in FIG. 9B, two second control lines CL2 (Rx4 and Rx6) overlap the first control lines CL1, and a second control line CL2 (Rx2) does not overlap any first control line CL1. In this case, coupling occurs between the two second control lines CL2 (Rx4 and Rx6) and the two first control lines CL1 in an overlap state. Further, as indicated with the alternate long and two short dashes arrow in FIG. 9B, coupling may occur between the second control line CL2 (Rx2) and the adjacent first control line CL1 in a non-overlap state. To prevent the coupling between the second control line CL2 (Rx2) and the first control line CL1 in a non-overlap state, in the present embodiment, of the three conductive lines included in each first control line CL1, the conductive line R3 (VCOMSEL) with fixed potential is provided so as to be the closest to the non-overlapping second control line CL2 (Rx2). The conductive line R3 is provided in the boundary portion between the area which overlaps the second control line CL2b and the area which does not overlap the second control line CL2b. The three conductive lines R1, R2 and R3 included in each first control line CL1 are arranged in the order of R3, R2 and R1 from the non-overlapping second control line CL2 (Rx2) side.

When each first control line CL1 has the above arrangement, unnecessary coupling is prevented, and thus, it is possible to further effectively prevent noise in the touch detection area and the degradation of the touch detection performance. The order of the conductive lines R2 and R1 may be reversed.

Third Modification Example

FIG. 10A is a plan view schematically showing the layout structure of the first and second control lines of the display device and the touch detection device according to a third modification example. In the third modification example, at least one group of the first control lines CL1 and the second control lines CL2b extends so as to intersect or overlap the other group of the first control lines CL1 and the second control lines CL2b at an inclination angle, in other words, at a slant, at overlapping positions.

As shown in FIG. 10A, in the third modification example, the second control lines CL2b connected to the second detection electrodes Rx2, . . . , Rxn−1 provided in the even-numbered columns extend in a direction parallel to the short sides of the second substrate SUB2 between the switches SW and the Tx scanner 32 (shift registers SR) in the non-display area ED on the short-side side of the second substrate SUB2. Further, at least a part of each second control line CL2, in the present modification example, the entire part of each second control line CL2 is formed so as to have a continuous uneven shape like waves, a sine wave or saw teeth or zigzag shape. Each portion of each second control line CL2 is inclined at an angle of, for example, 30 to 90 degrees to a direction parallel to the short sides of the second substrate SUB2.

Each first control line CL1 is bent in a stepwise manner. Each first control line CL1 extends from the Tx scanner 32 in a direction perpendicular to the short sides of the second substrate SUB2, is bent at right angle, extends in parallel to the short sides of the second substrate SUB2, is bent at right angle, and extends to a corresponding switch SW. Each first control line CL1 extends so as to partially intersect the inclined portions 64 of the second control lines CL2b. Since each second control line CL2 is formed in a wavelike shape, each first control line CL1 extends so as to intersect the second control lines CL2 with an inclination angle of θ to 90 degrees in all the overlapping portions. In this way, the first control lines CL1 do not overlap the second control lines CL2b in parallel. The area of the overlapping portions can be reduced. At the same time, the overlapping areas of the portions in which the first control lines CL1 overlap a plurality of second control lines CL2 are substantially equalized. Thus, it is possible to prevent noise in the touch detection area and the degradation of the touch detection performance.

FIG. 10B is a cross-sectional view schematically showing the cross-sectional surface of the control lines along the line E-E of FIG. 10A. In the above line structure, some second control lines CL2 overlap some first control lines CL1, and the other second control lines CL2 do not overlap any first control line CL1 in some intersecting portions. For example, in the cross-sectional surface shown in FIG. 10B, two second control lines CL2 (Rx4 and Rx6) overlap the first control lines CL1, and a second control line CL2 (Rx2) does not overlap any first control line CL1. In this case, coupling occurs between the two second control lines CL2 (Rx4 and Rx6) and the two first control lines CL1 in an overlap state. Further, as indicated with the alternate long and two short dashes arrow in FIG. 10B, coupling may occur between the second control line CL2 (Rx2) and the adjacent first control line CL1 in a non-overlap state. To prevent the coupling between the second control line CL2 (Rx2) and the first control line CL1 in a non-overlap state, in the present embodiment, of the three conductive lines included in each first control line CL1, the conductive line R3 (VCOMSEL) with fixed potential is provided so as to be the closest to the non-overlapping second control line CL2 (Rx2). The conductive line R3 is provided in the boundary portion between the area which overlaps the second control line CL2b and the area which does not overlap the second control line CL2b. The three conductive lines R1, R2 and R3 included in each first control line CL1 are arranged in the order of R3, R2 and R1 from the non-overlapping second control line CL2 (Rx2) side.

When each first control line CL1 has the above arrangement, unnecessary coupling is prevented, and thus, it is possible to further effectively prevent noise in the touch detection area and the degradation of the touch detection performance. The order of the conductive lines R2 and R1 may be reversed.

Fourth Modification Example

FIG. 11A is a plan view schematically showing the layout structure of the first and second control lines of the display device and the touch detection device according to a fourth modification example. In the fourth modification example, the second control lines CL2b connected to the second detection electrodes Rx2 to Rxn-1 provided in the even-numbered columns extend in a direction parallel to the short sides of the second substrate SUB2 between the switches SW and the Tx scanner 32 (shift registers SR) in the non-display area ED on the short-side side of the second substrate SUB2.

The first control line CL1 for transmitting a control signal to the respective switches SW extend from the shift registers SR1 to SRn to the respective switches SW in one direction. Each first control line CL1 is inclined at an angle θ, for example, 30 to 90 degrees, to a direction parallel to the short sides of the second substrate SUB2, in other words, to the second control lines CL2b. Further, at least a part of each first control line CL1, in the present modification example, the entire part of each first control line CL1 is formed so as to have a continuous uneven shape like waves, a sine wave or saw teeth or a zigzag shape in a plane direction.

Each first control line CL1 extends so as to partially cross the second control lines CL2b. Each first control line CL1 extends so as to intersect or overlap the second control lines CL2 at an inclination angle of θ to 90 degrees. Since each first control line CL1 is formed in a wavelike shape, each first control line CL1 intersects the second control lines CL2 in a direction substantially perpendicular to the second control lines CL2 in a large part of the overlapping portion.

In this way, the first control lines CL1 do not overlap the second control lines CL2b in parallel. The area of the overlapping portions can be further reduced. At the same time, the overlapping areas of the portions in which the first control lines CL1 overlap a plurality of second control lines CL2 are substantially equalized. Thus, it is possible to prevent noise in the touch detection area and the degradation of the touch detection performance.

FIG. 11B is a cross-sectional view schematically showing the cross-sectional surfaces of the control lines along the line F-F of FIG. 11A. In the above line structure, some second control lines CL2 overlap some first control lines CL1, and the other second control lines CL2 do not overlap any first control line CL1 at some intersecting positions. For example, in the cross-sectional surface shown in FIG. 11B, two second control lines CL2 (Rx4 and Rx6) overlap the first control lines CL1, and a second control line CL2 (Rx2) does not overlap any first control line CL1. In this case, coupling occurs between the two second control lines CL2 (Rx4 and Rx6) and the two first control lines CL1 in an overlap state. Further, as indicated with the alternate long and two short dashes arrow in FIG. 11B, coupling may occur between the second control line CL2 (Rx2) and the adjacent first control line CL1 in a non-overlap state. To prevent the coupling between the second control line CL2 (Rx2) and the first control line CL1 in a non-overlap state, in the present embodiment, of the three conductive lines included in each first control line CL1, the conductive line R3 (VCOMSEL) with fixed potential is provided so as to be the closest to the non-overlapping second control line CL2 (Rx2). The conductive line R3 is provided in the boundary portion between the area which overlaps the second control line CL2b and the area which does not overlap the second control line CL2b. The three conductive lines R1, R2 and R3 included in each first control line CL1 are arranged in the order of R3, R2 and R1 from the non-overlapping second control line CL2 (Rx2) side.

When each first control line CL1 has the above arrangement, unnecessary coupling is prevented, and thus, it is possible to further effectively prevent noise in the touch detection area and the degradation of the touch detection performance. The order of the conductive lines R2 and R1 may be reversed.

Fifth Modification Example

Figure 12:
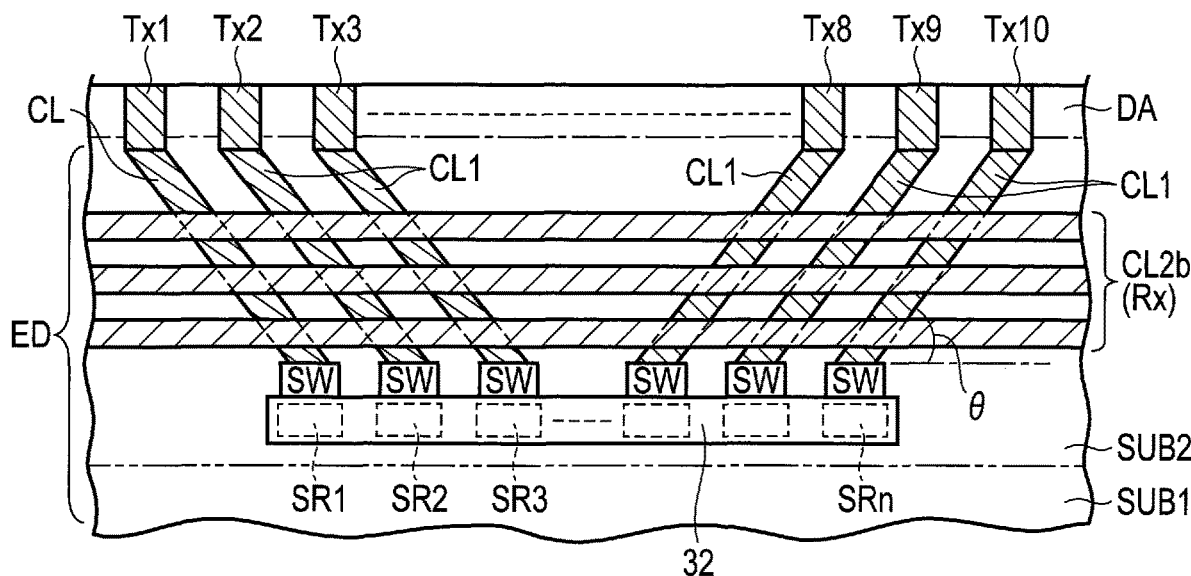
FIG. 12 is a plan view schematically showing the layout structure of the first and second control lines in the Tx drive circuit of the touch detection device according to a fifth modification example.

FIG. 12 is a plan view schematically showing the layout structure of the first and second control lines of the display device and the touch detection device according to a fifth modification example. In the fifth modification example, the switches SW of the Tx drive circuit are adjacent to the shift registers SR1 to SRn of the Tx scanner 32, respectively, and are away from ends of the first detection electrodes Tx.

The second control lines CL2b connected to the second detection electrodes Rx2 to Rxn-1 provided in the even-numbered columns extend in a direction parallel to the short sides of the second substrate SUB2 between ends of the first detection electrodes Tx and the switches SW in the non-display area ED on the short-side side of the second substrate SUB2.

The first control lines CL1 for transmitting a control signal from the respective switches SW to the respective first detection electrodes Tx are formed in a stripe fashion and linearly extend from the respective switches SW to ends of the respective first detection electrodes Tx. In the present modification example, the width (line thickness) of each first control line CL1 is substantially equal to the width of each first detection electrode Tx, or is substantially equal to the width of each second control line CL2b. Each first control line CL1 is inclined at an angle θ, for example, 30 to 90 degrees, to a direction parallel to the short sides of the second substrate SUB2, in other words, to the second control lines CL2b. Each first control line CL1 extends so as to cross the second control lines CL2b. Each first control line CL1 extends so as to intersect or overlap the second control lines CL2 at an inclination angle of θ. In this way, the first control lines CL1 do not overlap the second control lines CL2b in parallel. The area of the overlapping portions can be reduced. At the same time, the overlapping areas of the portions in which the first control lines CL1 overlap a plurality of second control lines CL2 are equalized. Thus, it is possible to prevent noise in the touch detection area and the degradation of the touch detection performance.

Sixth Modification Example

Figure 13:
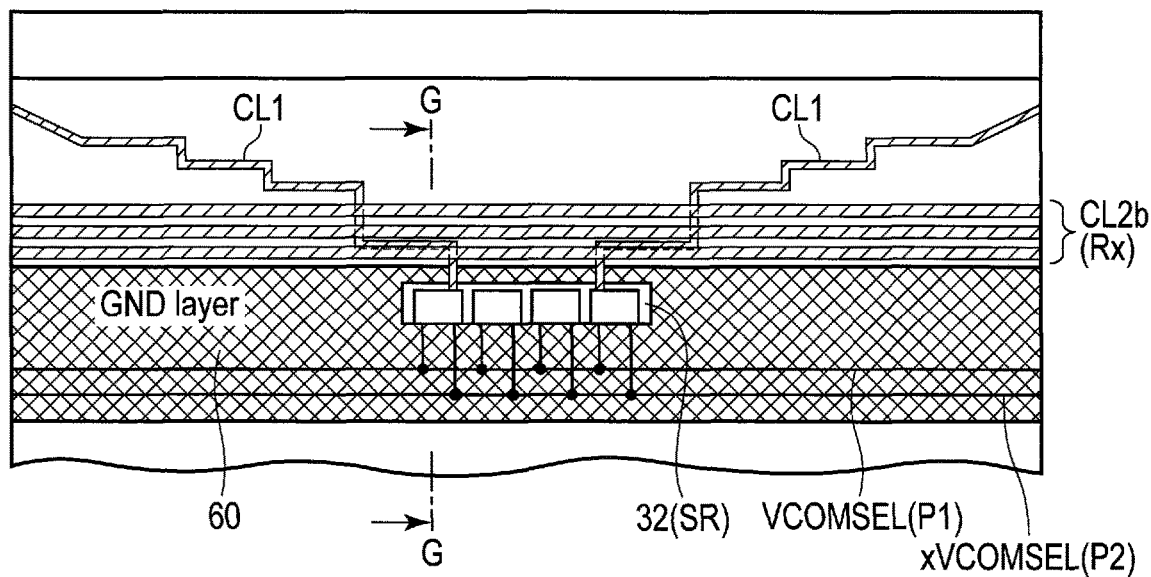
FIG. 13 is a plan view schematically showing the layout structure of the first and second control lines in the Tx drive circuit of the touch detection device according to a sixth modification example.

FIG. 13 is a plan view schematically showing the layout structure of the first and second control lines of the display device and the touch detection device according to a sixth modification example. FIG. 14 is the cross-sectional view of the display device along the line G-G of FIG. 13. In the sixth modification example, the display device further comprises two power control lines functioning as the first control lines. The display device comprises a first power control line P1 (VCOMSEL) and a second power control line P2 (xVCOMSEL) having an opposite phase on the first substrate SUB1. The first power control line P1 and the second power control line P2 extend along the side edges of the second substrate SUB2 outside the Tx scanner 32. The first power control line P1 and the second power control line P2 are connected to the shift registers SR of the Tx scanner 32.

The second control lines CL2b connected to the second detection electrodes Rx2 to Rxn−1 provided in the even-numbered columns are provided substantially in parallel to the short sides of the second substrate SUB2 between the switches SW and the Tx scanner 32 (shift registers SR) in the non-display area ED on the short-side side of the second substrate SUB2. Each first control line CL1 is bent in a stepwise manner. Each first control line CL1 extends from a corresponding shift register SR in a direction perpendicular to the short sides of the second substrate SUB2, is bent at right angle, extends in parallel to the short sides of the second substrate SUB2, is bent at right angle, and extends to a corresponding switch SW. Each first control line CL1 extends so as to partially intersect the inclined portions 64 of the second control lines CL2b.

Further, in the present modification example, the mesh ground layer 60 is formed on the peripheral portion of the second substrate SUB2 outside the second control lines CL2. The ground layer 60 overlaps the Tx scanner 32 and the first and second power control lines P1 and P2 on the first substrate SUB1. The ground layer 60 prevents coupling between the Tx scanner 32 and the second control lines CL2 and between either the first power control line P1 or the second power control line P2 and the second control lines CL2.

Second Embodiment

Figure 15:
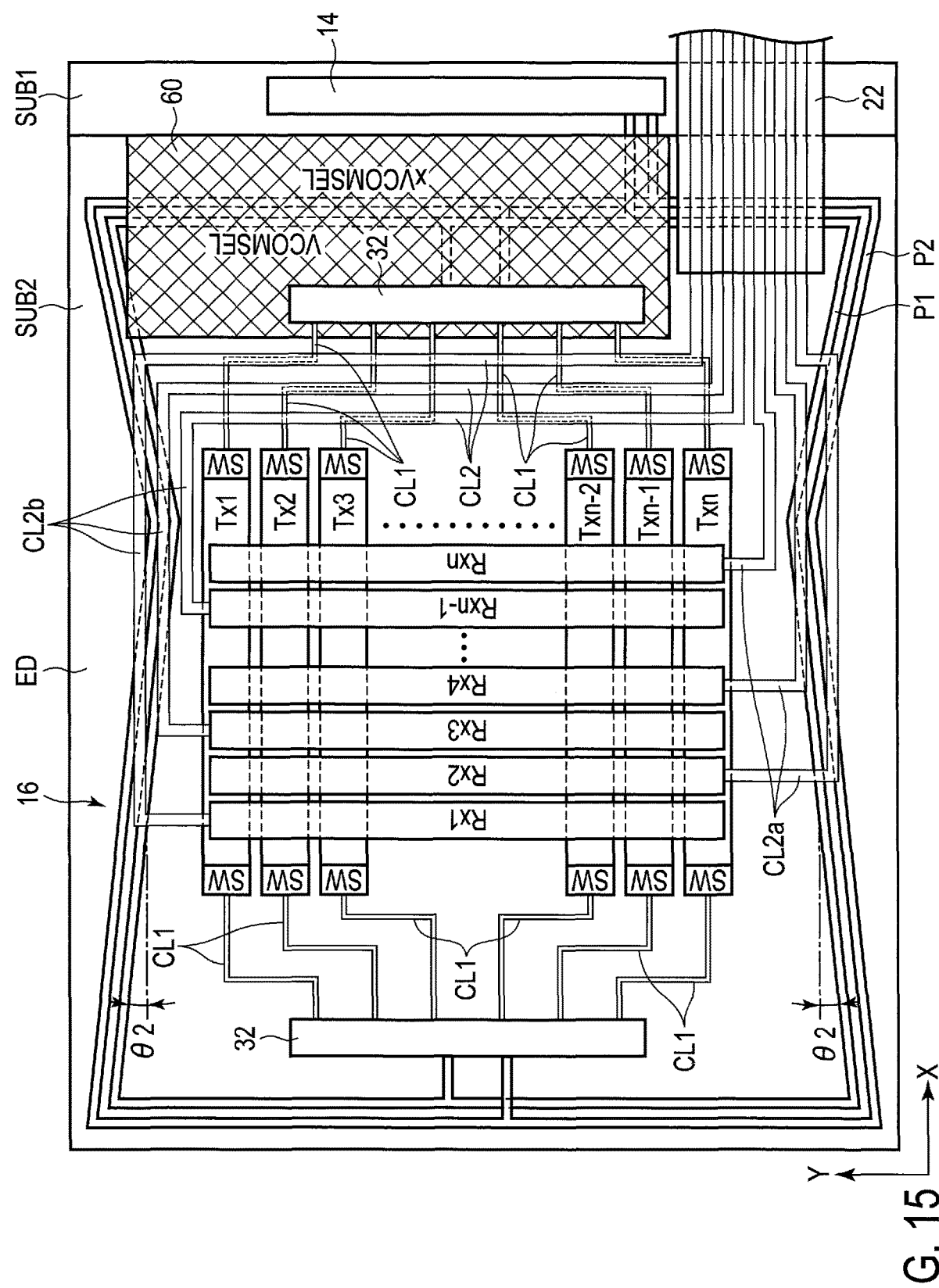
FIG. 15 is a plan view schematically showing the electrode structure and the line structure of a touch detection device in a display device according to a second embodiment.

FIG. 15 is a plan view schematically showing a touch detection device provided in a display device according to a second embodiment. FIG. 16 is a plan view schematically showing an example of the layout structure of control lines and power control lines.

In the second embodiment, a drive signal is input to a touch sensor (touch detection device) 16 from the two end sides of each first detection electrode Tx in the longitudinal direction. As shown in FIG. 15, the touch sensor 16 comprises a plurality of first detection electrodes Tx1 to Txn provided on a first substrate SUB1 and a plurality of second detection electrodes Rx1 to Rxn provided on the upper surface (a surface opposite to the first substrate SUB1) of a second substrate SUB2 which is an insulating layer. The first detection electrodes Tx1 to Txn are formed in a stripe fashion and extend in the longitudinal direction (first direction X) of the first substrate SUB1. The first detection electrodes Tx1 to Txn are arranged in parallel to each other at regular intervals in the width direction (second direction Y) perpendicular to the longitudinal direction. The first detection electrodes Tx1 to Txn face substantially the entire display area (touch detection area) DA.

The second detection electrodes Rx1 to Rxn are formed in a stripe fashion and extend in the width direction (second direction Y) of the second substrate SUB2, in other words, in a direction perpendicular to or intersecting the extension direction of the first detection electrodes Tx1 to Txn. The second detection electrodes Rx1 to Rxn are arranged in parallel to each other at regular intervals in the longitudinal direction of the second substrate SUB2. The second detection electrodes Rx1 to Rxn face substantially the entire display area DA. In this manner, in the display area DA, the second detection electrodes Rx1 to Rxn are provided so as to intersect the first detection electrodes Tx1 to Txn. Further, the intersections of the second detection electrodes Rx1 to Rxn face the first detection electrodes Tx1 to Txn across the intervening second substrate SUB2.

In the second embodiment, on the first substrate SUB1, a Tx scanner 32 comprising a plurality of shift registers SR is provided in each end side in the longitudinal direction. Switches SW are provided so as to be adjacent to the both ends of each first detection electrode Tx in the longitudinal direction, and are connected to the first detection electrode Tx. Each shift register SR of each Tx scanner 32 is connected to a corresponding switch SW by a corresponding first control line CL1.

A plurality of second control lines CL2 extend from ends of the second detection electrodes Rx1 to Rxn in the longitudinal direction and are connected to a second FPC 22 via a non-display area ED provided in a display panel 12. In the present embodiment, with respect to the second detection electrodes Rx1, Rx3, . . . , Rxn−1 provided in the odd-numbered columns, when the Y-direction is a vertical direction in FIG. 15, the second control lines CLb extend from the upper ends (second ends) of the second detection electrodes Rx (in other words, ends in the Y-direction) to the second FPC 22 via the non-display area ED on the long-side (first and/or second edge side) of the second substrate SUB2 and the non-display area ED on the short-side side (third edge side) of the second substrate SUB2. With respect to the second detection electrodes Rx2, Rx4, . . . , Rxn provided in the even-numbered columns, the second control lines CL2a extend from the lower ends (first ends) of the second detection electrodes Rx (in other words, the other ends in the Y-direction) to the second FPC 22 via the non-display area ED on the long-side side of the second substrate SUB2.

The second FPC 22 is attached to the short side of the second substrate SUB2 such that the attached portion is close to an end of the short side, in other words, the second FPC 22 is attached to the vicinity of the lower end of the short side when the Y-direction is a vertical direction in FIG. 15. Thus, the second control lines CL2b connected to the second detection electrodes Rx1, Rx3, . . . , Rxn−1 provided in the odd-numbered columns extend substantially over the entire length of the short side in the non-display area ED on the short-side side of the second substrate SUB2.

The first control lines CL1 and the second control lines CL2b are arranged in the same manner as the first embodiment in the short-side end portion of the second substrate SUB2 on the driver IC chip 14 side. The second control lines CL2b connected to the second detection electrodes Rx1, Rx3, . . . , Rxn−1 provided in the odd-numbered columns are provided in a direction substantially parallel to the short sides of the second substrate SUB2 between the switches SW and the Tx scanner 32 (shift registers SR) in the non-display area ED on the short-side side of the second substrate SUB2.

The first control lines CL1 for transmitting a control signal to the respective switches SW extend from the shift registers SR of the Tx scanner 32 to the respective switches SW. Each first control line CL1 is bent in, for example, a staircase pattern. Specifically, each first control line CL1 extends from a corresponding shift register SR in a direction perpendicular to the second control lines CL2b, is bent at right angle, extends in parallel to the second control lines CL2b, is bent at right angle, and extends to a corresponding switch SW in a direction perpendicular to or intersecting the second control lines CL2. In this manner, each first control line CL1 is provided so as to partially and perpendicularly overlap some second control lines CL2b, and extends so as to partially overlap a second control line CL2b in parallel. The width of each first control line CL1 is less than the width of each first detection electrode Tx and the width W2 of each second control line CL2. In the present embodiment, the width of each first control line CL1 is less than or equal to half the width of each second control line CL2, and is preferably less than or equal to one-fifth the width of each second control line CL2.

In the second embodiment, a first power control line (VCOMSEL) P1 and a second power control line (xVCOMSEL) P2 are provided in the non-display area of the first substrate SUB1, in other words, in the peripheral portion, and extend over the entire circumference. The first and second power control lines P1 and P2 functioning as the first control lines extend along the pair of long sides and the pair of short sides of the first substrate SUB1. The first and second power control lines P1 and P2 are electrically connected to the pair of Tx scanners 32 and the driver IC chip 14.

As shown in FIG. 15 and FIG. 16, of the first and second power control lines P1 and P2, the long-side line portions extending along the pair of long sides of the first substrate SUB1 extend at an angle θ2 (for example, 5 to 90 degrees) to a direction parallel to the long sides. In the present embodiment, the long-side line portions of the first and second power control lines P1 and P2 are bent in the central part. The long-side line portions of the first and second power control lines P1 and P2 extend at an angle θ2 toward the second detection electrode Rx side from an end of the long side of the first substrate SUB1 to substantially the central part, and extend at an angle θ2 toward the outside from the central part to the other end of the long side. In this way, the long-side line portions of the first and second power control lines P1 and P2 intersect and overlap the second control lines CL2a and CL2b at an angle to the second control lines CL2a and CL2b without extending in parallel to the second control lines CL2a or CL2b.

A mesh ground layer 60 is formed on the peripheral portion of the second substrate SUB2 outside the second control lines CL2. The ground layer 60 overlaps one of the Tx scanners 32 (for example, the Tx scanner 32 provided on the driver IC chip 14 side) on the first substrate SUB1, and the first and second power control lines P1 and P2. The ground layer 60 prevents coupling between the second control lines CL2 and the Tx scanner 32 and between the second control lines CL2 and either the first power control line P1 or the second power control line P2.

According to the touch detection device and the display device having the above structure in the present embodiment, each first control line CL1 connected to the first detection electrodes Tx1 to Txn for touch detection partially overlaps or intersects some second control lines CL2b. In these overlapping portions, the first control lines CL1 overlap the second control lines CL2b at an angle different from a parallel angle, thereby reducing the area overlapping the second control lines CL2b in parallel. At the same time, the width W1 of each first control line CL1 is less than the width W2 of each second control line CL2b (the width W1 is less than or equal to half the width W2, and is preferably less than or equal to one-fifth the width W2). Thus, the area (overlapping area) of the portions in which the first control lines CL1 overlap the second control lines CL2b can be reduced. In this way, the coupling capacity formed in the overlapping portions between the first control lines CL1 and the second control lines CL2b can be reduced.

The long-side line portions of the first and second power control lines P1 and P2 functioning as the control lines extend so as to intersect or overlap the second control lines CL2a and CL2b at an inclination angle θ2. Thus, none of the first and second power control lines P1 and P2 overlaps the second control lines CL2a or CL2b in parallel, thereby reducing the area of the overlapping portions. At the same time, the overlapping areas of the portions in which the power control lines overlap the second control lines CL2 are equalized. Thus, it is possible to prevent noise in the touch detection area and the degradation of the touch detection performance.

As described above, in the second embodiment, it is possible to obtain a touch detection device capable of realizing stable touch detection over the entire touch detection area and a display device comprising the touch detection device while preventing noise in the touch detection area and the degradation of the touch detection performance due to coupling capacity.

The number of first and second detection electrodes or their shape or material is not limited to the first embodiment, and may be arbitrarily changed. The first detection electrodes of the touch detection device may not be provided on the first substrate SUB1 of the display panel 12. The first detection electrodes may be stacked on the display surface of the second substrate SUB2 such that the first detection electrodes, an insulating layer and the second detection electrodes are stacked. The line structure or the stacked layer structure of the first control lines CL1 and the second control lines CL2b is not limited to the second embodiment. Any of the first to sixth modification examples may be applied.

Seventh Modification Example

FIG. 17 schematically shows a line structure according to a seventh modification example. In the above second embodiment, the end portions of the second control lines CL2a and CL2b connected to the second detection electrodes Rx may not be rectangular, and may be formed in a stepwise pattern having a plurality of stairs as shown in FIG. 17. In this stepwise pattern, the angle of intersection between the end portions of the second control lines CL2a and CL2b and the first and second power control lines P1 and P2 can be further increased, and can be close to 90 degrees. In this manner, it is possible to reduce the area of the portions in which the second control lines CL2a and CL2b overlap the first and second power control lines P1 and P2. Thus, coupling capacity can be further reduced.

Eighth Modification Example

FIG. 18 schematically shows a line structure according to an eighth modification example. In the above second embodiment, the first and second power control lines P1 and P2 overlap part of the second control lines CL2a and CL2b. However, the line structure is not limited to this example. As shown in FIG. 18, the first and second power control lines P1 and P2 may be apart from the second control lines CL2a and CL2b without overlapping the second control lines CL2a or CL2b. In this case, the first and second power control lines P1 and P2 are away from the second control lines CL2a and CL2b by a distance d for preventing coupling.

Third Embodiment

Figure 20:
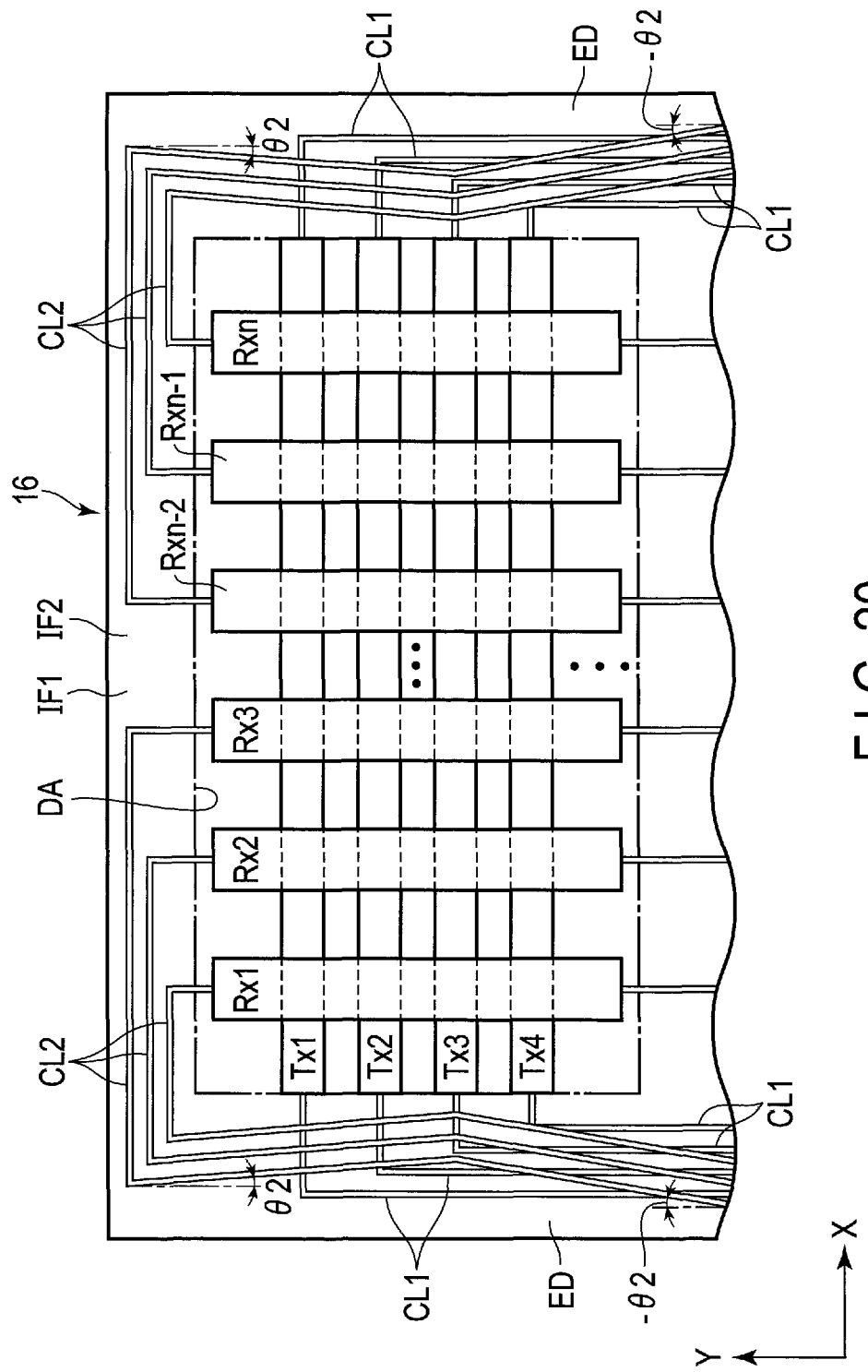
FIG. 20 is a plan view schematically showing the electrode structure and the line structure of the touch detection device according to the third embodiment.

FIG. 19 is a cross-sectional view of a display device comprising a touch detection device according to a third embodiment. FIG. 20 is a plan view schematically showing the touch detection device.

In the third embodiment, a touch detection device (touch sensor) 16 is structured as an independent touchpanel, and is provided on the display surface of a display panel 12.

More specifically, the touch detection device 16 comprises, for example, a first insulating layer IF1 formed of transparent synthetic resin, a plurality of first detection electrodes Tx1 to Txn provided on the first insulating layer IF1, a second insulating layer IF2 formed of transparent synthetic resin, and a plurality of second detection electrodes Rx1 to Rxn provided on the second insulating layer IF2. The second insulating layer IF2 is stacked on the first detection electrodes Tx1 to Txn and on the first insulating layer IF1. Thus, the first detection electrodes Tx1 to Txn face the second detection electrodes Rx1 to Rxn across the intervening second insulating layer IF2.

The display panel 12 comprises a first substrate SUB1, a second substrate SUB2 facing the first substrate SUB1 across an intervening gap, and a liquid crystal layer LQ provided between the first substrate and the second substrate. The first insulating layer IF1 of the touch detection device 16 is attached to the display surface of the display panel 12 with a transparent adhesive layer AD2. Further, in the present embodiment, a transparent cover panel 62 is attached onto the touch detection device 16 with a transparent adhesive layer AD1.

As shown in FIG. 20, the first detection electrodes Tx1 to Txn are formed in a stripe fashion and are arranged in the longitudinal direction (first direction X) of the first insulating layer IF1. The first detection electrodes Tx1 to Txn are arranged in parallel to each other at regular intervals in the width direction (second direction Y) perpendicular to the longitudinal direction. The first detection electrodes Tx1 to Txn face substantially the entire display area (touch detection area) DA.

The second detection electrodes Rx1 to Rxn are formed in a stripe fashion and extend in the width direction (second direction Y) of the second substrate SUB2, in other words, in a direction perpendicular to the extension direction of the first detection electrodes Tx1 to Txn. The second detection electrodes Rx1 to Rxn are arranged in parallel to each other at regular intervals in the longitudinal direction of the second substrate SUB2. The second detection electrodes Rx1 to Rxn face substantially the entire display area DA.

Thus, in the display area DA, the second detection electrodes Rx1 to Rx intersect the first detection electrodes Tx1 to Txn and further overlap the first detection electrodes Tx1 to Txn with the intervening second insulating layer IF2.

A plurality of first control lines CL1 are provided in a non-display area ED of the first insulating layer IF1. Some first control lines CL1 are connected to ends of the first detection electrodes Tx1 to Txn in the longitudinal direction, extend from the first detection electrodes in the first direction X, are bent substantially at right angle, and extend in the second direction Y (along a short side of the first insulating layer IF1). The first control lines CL1 are connected to a driver IC chip (not shown). The other first control lines CL1 are connected to the other ends of the first detection electrodes Tx1 to Txn in the longitudinal direction, extend from the first detection electrodes in the first direction X, are bent substantially at right angle, and extend in the second direction Y (along the other short side of the first insulating layer IF1). These first control lines CL1 are connected to the driver IC chip (not shown). A Tx drive signal (TPH or TPL) is supplied from the driver IC chip to the first detection electrodes Tx1 to Txn via the first control lines CL1.

A plurality of second control lines CL2 are provided in the non-display area ED of the second insulating layer IF2. Some second control lines CL2 extend in the second direction Y from ends of the second detection electrodes Rx1 to Rxn in the longitudinal direction, are bent in the first direction X (to right in FIG. 20), are bent in the second direction Y, and extend along a short side of the second insulating layer IF2. The other second control lines CL2 extend in the second direction Y from ends of the second detection electrodes Rx1 to Rxn in the longitudinal direction, are bent in the first direction X (to left in FIG. 20), are bent in the second direction Y, and extend along the other short side of the second insulating layer IF2. These second control lines CL2 are connected to a touch driver IC chip for touch detection (not shown). Thus, the detection signals detected in the second detection electrodes Rx1 to Rxn are transmitted to the touch driver IC chip through the second control lines CL2.

At least one group of the first control lines CL1 and the second control lines CL2b extends so as to intersect or overlap the other group of the first control lines CL1 and the second control lines CL2b at an inclination angle, in other words, at a slant, at overlapping positions.

In the present embodiment, the first control lines CL1 extend substantially in parallel to the short sides of the first insulating layer IF1, in other words, in the second direction Y, in both short-side end portions of the first insulating layer IF1. The second control lines CL2 extend at an angle $\theta 2$ (for example, 5 to 90 degrees) to a direction parallel to the short sides of the second insulating layer IF2 in both short-side end portions of the second insulating layer IF2. In the present embodiment, the second control lines CL2 are bent in the central part. The second control lines CL2 extend at an angle $\theta 2$ toward the second detection electrode Rx side to a direction parallel to the short sides of the second insulating layer IF2 from an end of the short side of the second insulating layer IF2 to substantially the central part, and extend at an angle $-\theta 2$ toward the outside to a direction parallel to the short sides of the second insulating layer IF2 from the central part to the other end of the short side. In this manner, the second control lines CL2 intersect and overlap the first control lines CL1 at an angle to the first control lines CL1 without extending in parallel to the first control lines CL1 in both short-side end portions of the first and second insulating layer IF1 and IF2.

According to the touch detection device and the display device having the above structure in the third embodiment, at least one group of the first control lines CL1 and the second control lines CL2b extends so as to intersect or overlap the other group of the first control lines CL1 and the second control lines CL2b at an inclination angle, in other words, at a slant, at overlapping positions. In this way, the first control lines CL1 do not overlap the second control lines CL2 in parallel. The area of the overlapping portions can be reduced. At the same time, the overlapping areas of the portions in which the first control lines CL1 overlap a plurality of second control lines CL2 are equalized. Thus, it is possible to prevent noise in the touch detection area and the degradation of the touch detection performance. In the third embodiment, it is possible to obtain a touch detection device capable of realizing stable touch detection over the entire touch detection area and a display device comprising the touch detection device while preventing noise in the touch detection area and the degradation of the touch detection performance due to coupling capacity.

The number of first and second detection electrodes or their shape or material is not limited to the first embodiment, and may be arbitrarily changed. The line structure or the stacked layer structure of the first control lines CL1 and the second control lines CL2b is not limited to the second embodiment. Any of the first to sixth modification examples may be applied. The display panel is not limited to a liquid crystal display panel. An organic electroluminescent display panel may be applied.

Ninth Modification Example

Figure 21:
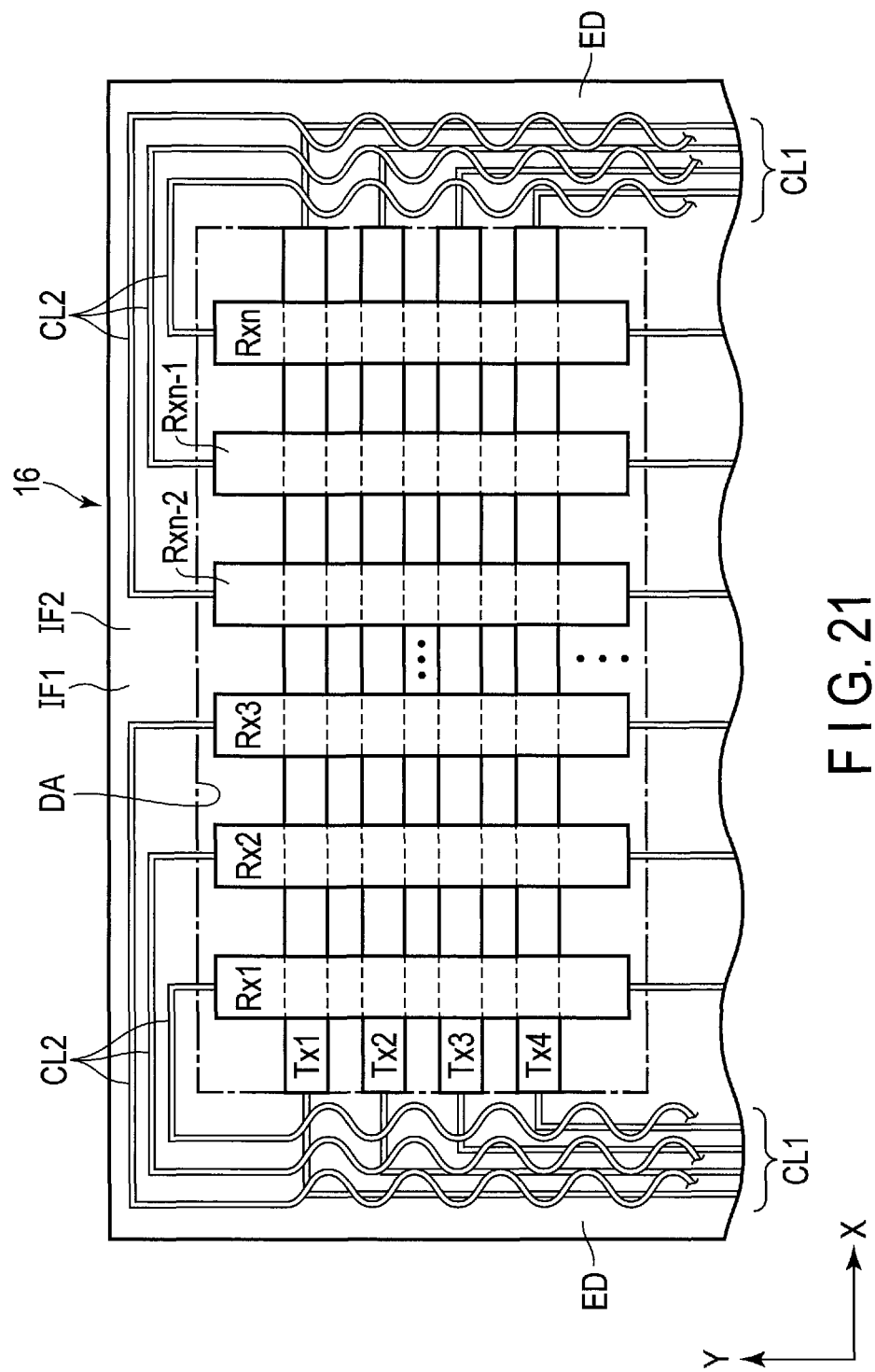
FIG. 21 is a plan view schematically showing a ninth modification example of the line structure according to the third embodiment.

FIG. 21 schematically shows a line structure according to a ninth modification example. In the above second embodiment, in the overlapping portions between the first control lines CL1 and the second control lines CL2, at least one group of lines, for example, each second control line CL2 is formed so as to have a continuous uneven shape like waves, a sine wave or saw teeth or zigzag shape. When each second control line CL2 is formed in, for example, a wavelike shape, the second control lines CL2 extend so as to intersect the first control lines CL1 at an inclination angle of 30 to 90 degrees in all the portions overlapping the first control lines CL1. In this way, the first control lines CL1 do not overlap the second control lines CL2b in parallel. The area of the overlapping portions can be reduced. At the same time, the overlapping areas of the portions in which the first control lines CL1 overlap a plurality of second control lines CL2 are substantially equalized. Thus, it is possible to prevent noise in the touch detection area and the degradation of the touch detection performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures which can be implemented by a person of ordinary skill in the art through arbitrary design changes to the structures described above as embodiments and modification examples of the present invention come within the scope of the present invention as long as they are in keeping with the spirit of the present invention. For example, the light emission surface of the liquid crystal display panel or the light guide is not limited to a flat surface, and may be a curved surface which is concave in the longitudinal direction or a curved surface which is convex in the longitudinal direction. The structural members of the liquid crystal display panel or the backlight device are not limited to a rectangular shape, and may have other shapes like a polygon with five or more sides, an ellipse or a truck. The materials of the structural members are not limited to the above examples, and may be selected from various materials.

In the present embodiments, a vertically long display device (display) is shown. However, the present embodiment is not limited to this example. A horizontally long display may be also employed. In the vertically long display, the first substrate protrudes from one of the short sides of the second substrate. In the horizontally long display, a long-side portion of the first substrate protrudes from one of the long sides of the second substrate. Thus, in the horizontally long display, for example, in FIG. 1, the X-direction is a width direction, and the Y-direction is a height direction.

Other effects which can be obtained by the above embodiments and modification examples and are self-evident from the description in this specification or can be arbitrarily conceived by a person of ordinary skill in the art are considered to be achievable by the present invention as a matter of course.

What is claimed is:

1. A touch detection device comprising:
   a plurality of first detection electrodes each extending in a second direction and arranged at intervals in a first direction crossing the second direction in a detection area;
   a plurality of second detection electrodes each extending in the first direction and arranged at intervals in the second direction to intersect the first detection electrode in the detection area;
   an insulating layer between the first detection electrodes and the second detection electrodes;
   a plurality of first control lines including first portions extending in the second direction each connected to a corresponding first detection electrode, second portions extending in the first direction each connected to a corresponding first portion, and third portions extending in the second direction each connected to a corresponding second portion, respectively, and arranged in a non-detection area; and
   a plurality of second control lines electrically connected to the second detection electrodes, respectively, and arranged in the non-detection area, the second control lines including fourth portions extending in the first direction,
   wherein each of the second portions of the first control lines overlaps a corresponding one of the fourth portions of the second control lines in parallel, and areas where the second portions overlap the fourth portions, respectively, are substantially the same as each other.

2. A touch detection device comprising:
   a plurality of first detection electrodes in a detection area;
   a plurality of second detection electrodes in the detection area, extending to intersect the first detection electrodes;
   an insulating layer between the first detection electrodes and the second detection electrodes;

a plurality of first control lines connected to the first detection electrodes, respectively, and provided in a non-detection area; and a plurality of second control lines connected to the second detection electrodes, respectively, and provided in the non-detection area, and the second control lines overlapping the first control lines at a plurality of positions as seen in a plan view, such that areas of overlapping portions in which the first control lines overlap the second control lines are substantially the same, wherein at least one group of the first control lines and the second control lines extends so as to intersect and overlap the other group of the first control lines and the second control lines at an angle other than 90 degrees in the overlapping portions.

3. The touch detection device of claim 2, wherein
the second control lines linearly extend and comprise a plurality of inclined portions inclined at a predetermined angle other than 90 degrees with respect to the first control lines, and the first control lines intersect the inclined portions.

4. The touch detection device of claim 2, wherein
the second control lines linearly extend, and the first control lines linearly extend in a direction inclined with respect to the second control lines, and intersect the second control lines at an angle other than 90 degrees.

5. The touch detection device of claim 4, wherein
each of the second control lines extends in a first direction overall, and comprises a plurality of continuous projections and depressions having the angle other than 90 degrees in a plane direction.

6. The touch detection device of claim 5, wherein
each of the second control lines is formed in a wavelike shape.

7. The touch detection device of claim 4, wherein
each of the first control lines extends in one direction, and comprises a plurality of continuous projections and depressions in a plane direction.

8. The touch detection device of claim 7, wherein
each of the first control lines is formed in a wavelike shape.

9. The touch detection device of claim 1, further comprising a power control line supplying a power to a circuit, and a ground line overlapping the power control line and connected to the circuit.

10. The touch detection device of claim 9, wherein the circuit includes shift registers, and the ground line overlaps the shift registers.

11. The touch detection device of claim 1, wherein the first control lines include a power control line in the non-detection area, and at least a part of the power control line extends to intersect and overlap the second control lines at an angle.

12. The touch detection device of claim 1, wherein:
a line width of each of the first control lines is less than a width of each of the first detection electrodes and a line width of each of the second control lines.

13. The touch detection device of claim 12, wherein the first control lines are connected to the first detection electrodes via a switch including a plurality of switching elements.

14. The touch detection device of claim 13, wherein the switch is provided at a position closer to the first detection electrodes than positions at which the first control lines overlap the second control lines.

15. The touch detection device of claim 13, wherein each of the first control lines includes a plurality of conductive lines for inputting two or more select signals to the switching elements.

16. The touch detection device of claim 15, wherein the conductive lines include a first conductive line and a second conductive line for supplying a switch signal to the switching elements in a touch detection period, and a third conductive line for supplying a switch signal to the switching elements in a period other than the touch detection period, and the third conductive line is provided in a boundary portion between an area which overlaps the second control lines and an area which does not overlap the second control lines.

17. A display device comprising:
a display panel comprising a first substrate, the first substrate comprising a display area including a plurality of pixels and a non-display area; and a touch detection device at the display panel, wherein
the touch detection device comprises:
a plurality of first detection electrodes each extending in a second direction and arranged at intervals in a first direction crossing the second direction in the display area;

a plurality of second detection electrodes each extending in the first direction and arranged at intervals in the second direction to intersect the first detection electrodes in the display;

an insulating layer between the first detection electrodes and the second detection electrodes;

a plurality of first control lines including first portions extending in the second direction each connected to a corresponding first detection electrode, second portions extending in the first direction each connected to a corresponding first portion, and third portions extending in the second direction each connected to a corresponding second portion, and arranged in the non-display area; and a plurality of second control lines electrically connected to the second detection electrodes, respectively, and arranged in the non-display area, the second control lines including fourth portions extending in the first direction, wherein each of the second portions of the first control lines overlaps a corresponding one of the fourth portions of the second control lines in parallel, and each of areas where the second portions overlap the fourth portions, respectively, are substantially the same as each other.

18. The display device of claim 17, wherein
the display panel comprises a second substrate facing the first substrate and forming the insulating layer, and a liquid crystal layer between the first substrate and the second substrate, and the first detection electrodes are provided on the first substrate, and the second detection electrodes are provided on the second substrate.

19. The display device of claim 17, wherein
the display panel comprises a second substrate facing the first substrate, and a liquid crystal layer provided between the first substrate and the second substrate, and the touch detection device overlaps the second substrate.

20. The display device of claim 17, wherein
a line width of each of the first control lines is less than a width of each of the first detection electrodes and a line width of each of the second control lines.

* * * * *